(12) United States Patent
Sharma

(10) Patent No.: US 11,727,128 B2
(45) Date of Patent: *Aug. 15, 2023

(54) METHOD AND APPARATUS FOR MULTI-CHANNEL SECURE COMMUNICATION AND DATA TRANSFER

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/407,661

(22) Filed: Aug. 20, 2021

(65) Prior Publication Data
US 2021/0383001 A1 Dec. 9, 2021

Related U.S. Application Data

(63) Continuation of application No. 16/938,301, filed on Jul. 24, 2020, now Pat. No. 11,321,474, which is a continuation of application No. 15/812,376, filed on Nov. 14, 2017, now Pat. No. 10,762,221.

(60) Provisional application No. 62/421,749, filed on Nov. 14, 2016.

(51) Int. Cl.
*H04L 9/40* (2022.01)
*G06F 21/60* (2013.01)
*H04W 12/06* (2021.01)

(52) U.S. Cl.
CPC ............ *G06F 21/606* (2013.01); *H04L 63/04* (2013.01); *H04L 63/0428* (2013.01); *H04L 63/08* (2013.01); *H04W 12/06* (2013.01)

(58) Field of Classification Search
CPC ... G06F 21/606; H04L 63/04; H04L 63/0428; H04L 63/08; H04W 12/06
USPC .............................................................. 726/4
See application file for complete search history.

(56) References Cited

U.S. PATENT DOCUMENTS

| | | | |
|---|---|---|---|
| 7,698,566 B1 | 4/2010 | Stone | |
| 8,620,666 B1 * | 12/2013 | Whitmore | ............... G10L 17/00 704/246 |
| 2002/0066033 A1 | 5/2002 | Dobbins et al. | |
| 2002/0157019 A1 * | 10/2002 | Kadyk | ................ H04L 63/0281 726/4 |
| 2003/0065950 A1 * | 4/2003 | Yarborough | ........ H04L 63/0281 726/4 |
| 2006/0021004 A1 | 1/2006 | Moran et al. | |
| 2006/0236369 A1 | 10/2006 | Covington | |
| 2009/0083538 A1 | 3/2009 | Merugu et al. | |

(Continued)

*Primary Examiner* — Michael S McNally
(74) *Attorney, Agent, or Firm* — Alston & Bird LLP

(57) ABSTRACT

A method, apparatus and computer program product are disclosed to provide for the selective establishment and use of secure communication channels to facilitate the exchange of data objects containing potentially sensitive information in a network environment. In some example implementations, upon detection that the processing of a network entity request implicates the exchange of non-public information amongst one or more other network entities, one or more secure communication channels are established between a secure transfer system and the relevant network entities such that non-public information neither passes to nor resides on system components associated with non-secure network entities.

25 Claims, 10 Drawing Sheets

(56) References Cited

U.S. PATENT DOCUMENTS

2009/0199276 A1* 8/2009 Schneider .......... H04L 63/0815
726/5
2016/0224774 A1 8/2016 Pender

* cited by examiner

| Credit Card | **********5454 ✓ |
| Expiration Date | 12/19 ✓ |
| CVV | ✓ |
| Payment failed | 729060 ✗ |

Continue  Cancel

722

| Credit Card | **********5454 ✓ |
| Expiration Date | 12/19 ✓ |
| CVV | ✓ |
| Customer hang up. | ✗ |

Continue  Cancel

Figure 7C

METHOD AND APPARATUS FOR MULTI-CHANNEL SECURE COMMUNICATION AND DATA TRANSFER

CROSS REFERENCE TO RELATED APPLICATIONS

This application is a Continuation of U.S. Non-Provisional patent application Ser. No. 16/938,301, filed Jul. 24, 2020 and entitled "Method and Apparatus for Multi-Channel Secure Communication and Data Transfer," which is a Continuation of U.S. Non-Provisional patent application Ser. No. 15/812,376, filed Nov. 14, 2017 and entitled "Method and Apparatus for Multi-Channel Secure Communication and Data Transfer," which claims priority to, and the benefit of, U.S. Provisional Application No. 62/421,749 filed Nov. 14, 2016, the entire disclosures of each of which are hereby incorporated herein by reference in their entireties for all purposes.

TECHNICAL FIELD

An example embodiment relates generally to electronic communication technology, particularly in the context of providing for the selective establishment and use of secure communication channels to facilitate the exchange of data objects containing potentially sensitive information in a network environment.

BACKGROUND

As high-speed, high-bandwidth networks have become widely available, many people have come to expect and rely on the ability to use computers, mobile devices, and other technologies to remotely communicate with the other individuals and entities that are associated with many aspects of their lives. In order to meet such expectations, many entities that have traditionally relied on face-to-face, in-person communication to interact with the public have expanded their operations to incorporate call centers, interactive websites and other contact portal systems that allow for remote, electronic communication.

While the use of remote, electronic communication is often more efficient and convenient than traditional face-to-face communication, it presents a number of technical and operational challenges. Such challenges are compounded in situations where the communication between an individual and a contact portal system involves the movement and storage of private, confidential, and otherwise potentially sensitive information across network connections and network components that may be susceptible to intrusion from unauthorized entities. The invention disclosed herein addresses these and other technical challenges, and provides for the solutions described and otherwise disclosed herein.

BRIEF SUMMARY

A method, apparatus and computer program product are therefore provided in accordance with an example embodiment in order to provide for multi-channel secure transmissions of potentially sensitive data. In this regard, the method, apparatus and computer program product of an example embodiment provide for the rerouting of communication between a source system and a contact portal system through separate, secure communication channels with a secure transfer system.

In an example embodiment, a method for the selective establishment and use of secure communication channels to facilitate the exchange of data objects containing potentially sensitive information in a network environment, is provided, the method comprising receiving, at a secure transfer system, a request from a first network entity to establish a secure communication channel with a second network entity; causing a first secure communication channel to be established between the secure transfer system and the second network entity; causing a second secure communication channel to be established between the secure transfer system and the first network entity; receiving, at the secure transfer system via the first secure communication channel, a data object comprising non-public information associated with the second network entity; and transmitting, via the second secure communication channel, a set of status information associated with the data object.

In some example implementations of such a method, the method further comprises causing a non-secure communication channel between the first network entity and the second network entity to be terminated based at least in part on causing the first secure communication channel to be established. In some such example implementations and in other example implementations, the first network entity is a contact portal system comprising an interactive voice recognition system.

In another embodiment, an apparatus for the selective establishment and use of secure communication channels to facilitate the exchange of data objects containing potentially sensitive information in a network environment, is provided, the apparatus comprising at least one processor and at least one memory storing computer program code, the at least one memory and the computer program code configured to, with the processor, cause the apparatus to at least: receive, at a secure transfer system, a request from a first network entity to establish a secure communication channel with a second network entity; cause a first secure communication channel to be established between the secure transfer system and the second network entity; cause a second secure communication channel to be established between the secure transfer system and the first network entity; receive, at the secure transfer system via the first secure communication channel, a data object comprising non-public information associated with the second network entity; and transmit, via the second secure communication channel, a set of status information associated with the data object.

In some example implementations of such an apparatus, the at least one memory and the computer program code are further configured to, with the processor, cause the apparatus to at least cause a non-secure communication channel between the first network entity and the second network entity to be terminated based at least in part on causing the first secure communication channel to be established. In some such example implementations, and in other example implementations, the first network entity is a contact portal system comprising an interactive voice recognition system.

In another embodiment, a computer program product for the selective establishment and use of secure communication channels to facilitate the exchange of data objects containing potentially sensitive information in a network environment is provided, the computer program product comprising at least one non-transitory computer-readable storage medium having computer-executable program code instruction stored therein, the computer-executable program code instructions comprising program code instructions configured to: receive, at a secure transfer system, a request from a first network entity to establish a secure communication channel with a second network entity; cause a first secure communication channel to be established between the secure transfer system and the second network entity; cause a second secure communication channel to be established between the secure transfer system and the first network entity; receive, at the secure transfer system via the first secure communication channel, a data object comprising non-public information associated with the second network entity; and transmit, via the second secure communication channel, a set of status information associated with the data object.

In some example implementations of such a computer program product, the computer-executable program code instructions further comprising program code instructions configured to: cause a non-secure communication channel between the first network entity and the second network entity to be terminated based at least in part on causing the first secure communication channel to be established. In some such example implementations, and in other example implementations, the first network entity is a contact portal system comprising an interactive voice recognition system.

In another embodiment, a method for the selective establishment and use of secure communication channels to facilitate the exchange of data objects containing potentially sensitive information in a network environment is provided, the method comprising: receiving, at a first network entity, via a non-secure communication channel, a request from a second network entity; determining that the request received from the second network entity requires the receipt of non-public information associated with the second network entity; transmitting to a secure transfer system a request that a secure communication channel be established between the second network entity and the secure transfer system; and terminating the non-secure communication channel between the first network entity and the second network entity.

In some example implementations of such a method, the method further comprises transmitting to the secure transfer system a request that a secure communication channel be established between the first network entity and the secure transfer system. In some such example implementations, and in other example implementations, the first network entity is a contact portal system comprising an interactive voice recognition system.

In another embodiment, an apparatus for the selective establishment and use of secure communication channels to facilitate the exchange of data objects containing potentially sensitive information in a network environment is provided, the apparatus comprising at least one processor and at least one memory storing computer program code, the at least one memory and the computer program code configured to, with the processor, cause the apparatus to at least: receive, at a first network entity, via a non-secure communication channel, a request from a second network entity; determine that the request received from the second network entity requires the receipt of non-public information associated with the second network entity; transmit to a secure transfer system a request that a secure communication channel be established between the second network entity and the secure transfer system; and terminate the non-secure communication channel between the first network entity and the second network entity.

In some example implementations of such an apparatus, the at least one memory and the computer program code are further configured to, with the processor, cause the apparatus to at least: transmit to the secure transfer system a request that a secure communication channel be established between the first network entity and the secure transfer system. In some such example implementations and in other example implementations, the first network entity is a contact portal system comprising an interactive voice recognition system.

In another embodiment, a computer program product for the selective establishment and use of secure communication channels to facilitate the exchange of data objects containing potentially sensitive information in a network environment is provided, the computer program product comprising at least one non-transitory computer-readable storage medium having computer-executable program code instruction stored therein, the computer-executable program code instructions comprising program code instructions configured to: receive, at a first network entity, via a non-secure communication channel, a request from a second network entity; determine that the request received from the second network entity requires the receipt of non-public information associated with the second network entity; transmit to a secure transfer system a request that a secure communication channel be established between the second network entity and the secure transfer system; and terminate the non-secure communication channel between the first network entity and the second network entity.

In some example implementations of such a computer program product, the computer-executable program code instructions further comprise program code instructions configured to: cause a non-secure communication channel between the first network entity and the second network entity to be terminated based at least in part on causing the first secure communication channel to be established. In some such example implementations and in other example implementations, the first network entity is a contact portal system comprising an interactive voice recognition system.

In another embodiment, an apparatus for the selective establishment and use of secure communication channels to facilitate the exchange of data objects containing potentially sensitive information in a network environment is provided, the apparatus comprising at least one processor and at least one memory storing computer program code, the at least one memory and the computer program code configured to, with the processor, cause the apparatus to at least: receive a set of data streams associated with one or more source systems; extract from the set of data streams a set of source system status information; convert the extract set of source system status information into a plurality of renderable objects; and transmit a control signal causing the set of renderable objects to be displayed on a device associated with a contact portal system.

In an embodiment, a method can be carried out for selective establishment and use of at least one secure communication channel to facilitate the exchange of data objects containing private or sensitive information in a network environment. In some embodiments, the method can comprise: establishing a communication channel between a first network entity and a second network entity; receiving at the first network entity, a request comprising a contextual data object from the second network entity; in an instance in which the contextual data object is indicative of a need for a secure communication channel causing the secure communication channel to be established between the secure transfer system and the second network entity; causing a second communication channel to be established between the secure transfer system and the first network entity; receiving, at the secure transfer system via the secure communication channel, a data object comprising said private or sensitive information associated with the second network entity; and transmitting via the second communication channel, a set of status information associated with the data object, wherein said status information is indicative of whether the data object was successfully transmitted via the secure communication channel. In some embodiments, said causing the secure communication channel to be established between the secure transfer system and the second network entity comprises automatically causing the secure communication channel to be established between the secure transfer system and the second network entity. In some embodiments, the first network entity comprises a contact portal system. In some embodiments, the contact portal system comprises an online interface or an interactive voice response (IVR) system accessible via one or more communication channels. In some embodiments, the second network entity comprises a mobile device or a computer. In some embodiments, the method can further comprise: receiving, at the first network entity, from the second network entity, an authentication data object, wherein the authentication data object comprises one or more of: a password, voice scan, a facial scan, a fingerprint scan, a query response, a social security number, a portion of the social security number, a last four digits of the social security number, or a pin number. In some embodiments, the method can further comprise: causing display, via an interface, to an agent or agent device associated with the first network entity, said status information. In some embodiments, the first communication channel is secure. In some embodiments, the first communication channel is not secure. In some embodiments, the method can further comprise: transmitting the private or sensitive information towards the second network entity. In some embodiments, the private or sensitive information comprises one or more of: a cardholder name, credit card information, a pin number, a mailing address of a cardholder, account number, date of birth, or a social security number. In some embodiments, the second communication channel is not secure. In some embodiments, the method can further comprise: transmitting, towards the first network entity or the second network entity, a confirmation that the secure communication channel has been established between the secure transfer system and the second network entity. In some embodiments, the method can further comprise: terminating the secure communication channel once the data object comprising said private or sensitive information associated with the second network entity is received at the secure transfer system.

According to another embodiment, an apparatus can be provided for the selective establishment and use of secure communication channels to facilitate the exchange of data objects containing private or sensitive information in a network environment. In some embodiments, the apparatus can comprise: a processor; and a memory storing program code. In some embodiments, the at least one memory and the program code being configured to, with the processor, cause the apparatus to at least: establish a communication channel between a first network entity and a second network entity; receive a request comprising a contextual data object and a authentication data object from the second network entity; in an instance in which the contextual data object is indicative of a need for a secure communication channel causing the secure communication channel to be established between the secure transfer system and the second network entity; cause a second communication channel to be established between the secure transfer system and the first network entity; receive, via the secure communication channel, a data object comprising said private or sensitive information associated with the second network entity; and transmit via the second communication channel, a set of status information associated with the data object, wherein said status information is indicative of whether the data object was successfully transmitted via the secure communication channel. In some embodiments, said causing the secure communication channel to be established between the secure transfer system and the second network entity comprises automatically causing the secure communication channel to be established between the secure transfer system and the second network entity. In some embodiments, the first network entity is a contact portal system. In some embodiments, the contact portal system comprises an online interface or an interactive voice response (IVR) system accessible via one or more communication channels. In some embodiments, the second network entity comprises a mobile device or a computer. In some embodiments, the contextual data object comprises an indication of a reason for the communication. In some embodiments, the at least one memory and the program code are further configured to, with the processor, cause the apparatus to at least: receive an authentication data object, wherein the authentication data object comprises one or more of: a password, voice scan, a facial scan, a fingerprint scan, a query response, a social security number, a portion of the social security number, a last four digits of the social security number, or a pin number. In some embodiments, the at least one memory and the program code are further configured to, with the processor, cause the apparatus to cause display of the status information to an agent associated with the first network entity via an interface. In some embodiments, the first communication channel is secure. In some embodiments, the first communication channel is not secure. In some embodiments, the second communication channel is secure or wherein information is transmitted via a secure method. In some embodiments, the private or sensitive information comprises one or more of: a cardholder name, credit card information, a pin number, a mailing address of a cardholder, account number, date of birth, or a social security number. In some embodiments, the second communication channel is not secure. In some embodiments, the at least one memory and the program code are further configured to, with the processor, cause the apparatus to at least: transmit, towards the first network entity or the second network entity, confirmation that the secure communication channel has been established between the secure transfer system and the second network entity. In some embodiments, the at least one memory and the program code are further configured to, with the processor, cause the apparatus to at least: terminate the secure communication channel once the data object comprising said private or sensitive information associated with the second network entity is received.

According to another embodiment, a non-transitory computer readable medium can be provided that comprises program code that, when executed by a processor, causes the processor to: establish a communication channel between a first network entity and a second network entity; receive a request comprising a contextual data object and a authentication data object from the second network entity; in an instance in which the contextual data object is indicative of a need for a secure communication channel, cause the secure communication channel to be established between the secure transfer system and the second network entity; cause a second communication channel to be established between the secure transfer system and the first network entity; receive, via the secure communication channel, a data object comprising said private or sensitive information associated with the second network entity; and transmit via the second communication channel, a set of status information associated with the data object, wherein said status information is indicative of whether the data object was successfully transmitted via the secure communication channel. In some embodiments, said causing the secure communication channel to be established between the secure transfer system and the second network entity comprises automatically causing the secure communication channel to be established between the secure transfer system and the second network entity. In some embodiments, the first network entity is a contact portal system. In some embodiments, the contact portal system comprises an online interface or an interactive voice response (IVR) system accessible via one or more communication channels. In some embodiments, the second network entity comprises a mobile device or a computer. In some embodiments, the contextual data object comprises an indication of a reason for the communication. In some embodiments, the computer readable medium can further comprise program code that, when executed by a processor, causes the processor to: receive an authentication data object, wherein the authentication data object comprises one or more of: a password, voice scan, a facial scan, a fingerprint scan, a query response, a social security number, a portion of the social security number, a last four digits of the social security number, or a pin number. In some embodiments, the status information is displayed to an agent associated with the first network entity via an interface. In some embodiments, the first communication channel is secure. In some embodiments, the first communication channel is not secure. In some embodiments, the second communication channel is secure or wherein information is transmitted via a secure method. In some embodiments, the private or sensitive information comprises one or more of: a cardholder name, credit card information, a pin number, a mailing address of a cardholder, account number, date of birth, or a social security number. In some embodiments, the second communication channel is not secure. In some embodiments, the computer readable medium can further comprise program code that, when executed by a processor, causes the processor to: transmit, towards the first network entity or the second network entity, a confirmation that the secure communication channel has been established between the secure transfer system and the second network entity. In some embodiments, the computer readable medium can further comprise program code that, when executed by a processor, causes the processor to: terminate the secure communication channel once the data object comprising said private or sensitive information associated with the second network entity is received at the secure transfer system.

In example implementations of such an apparatus, the set of source system status information comprises an indication associated with the transfer of non-public information associated with the one or more source systems from the one or more source systems to a secure transfer system over a secure communication channel.

BRIEF DESCRIPTION OF THE DRAWINGS

Figure 1:
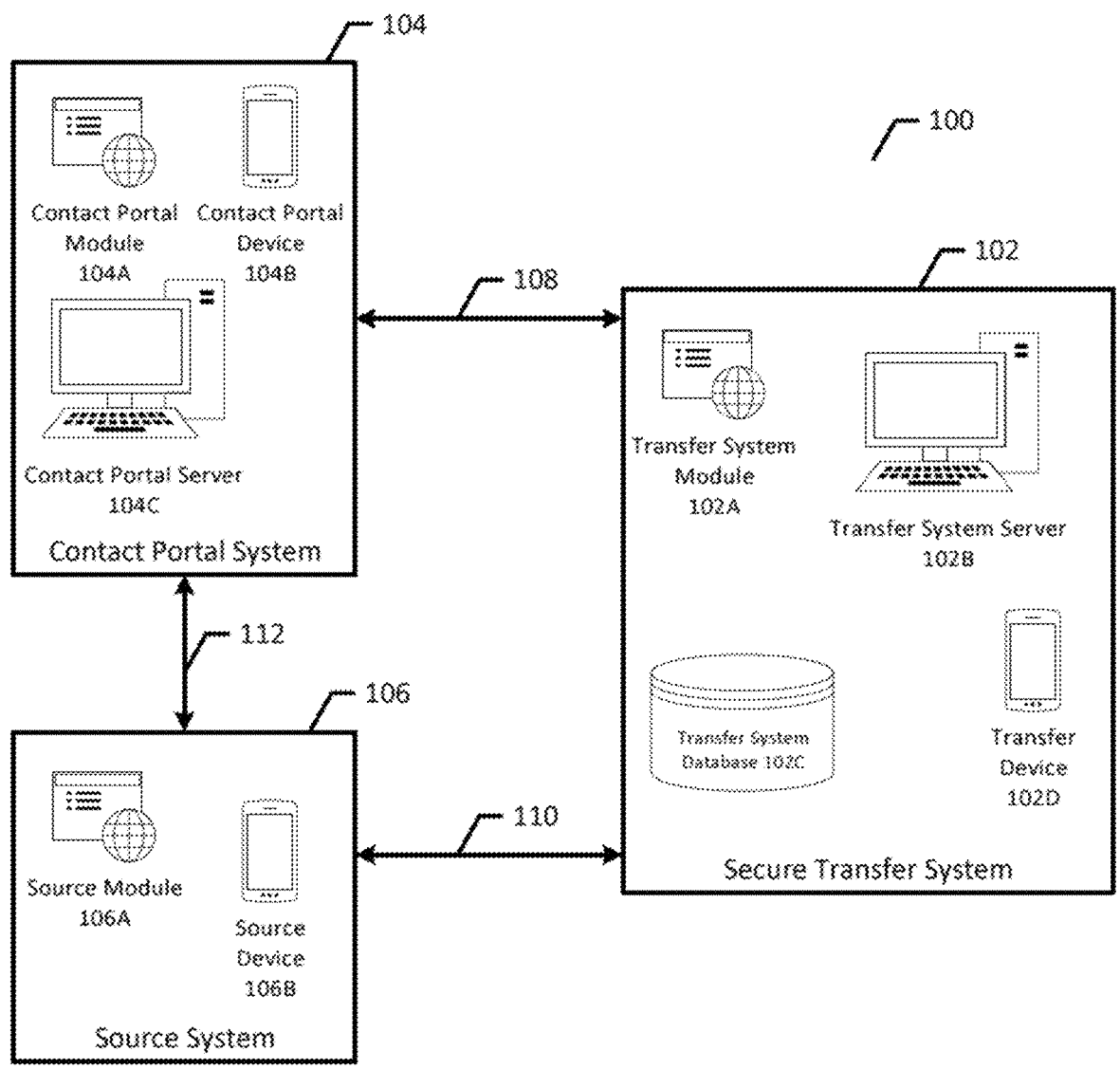
Figure 2:
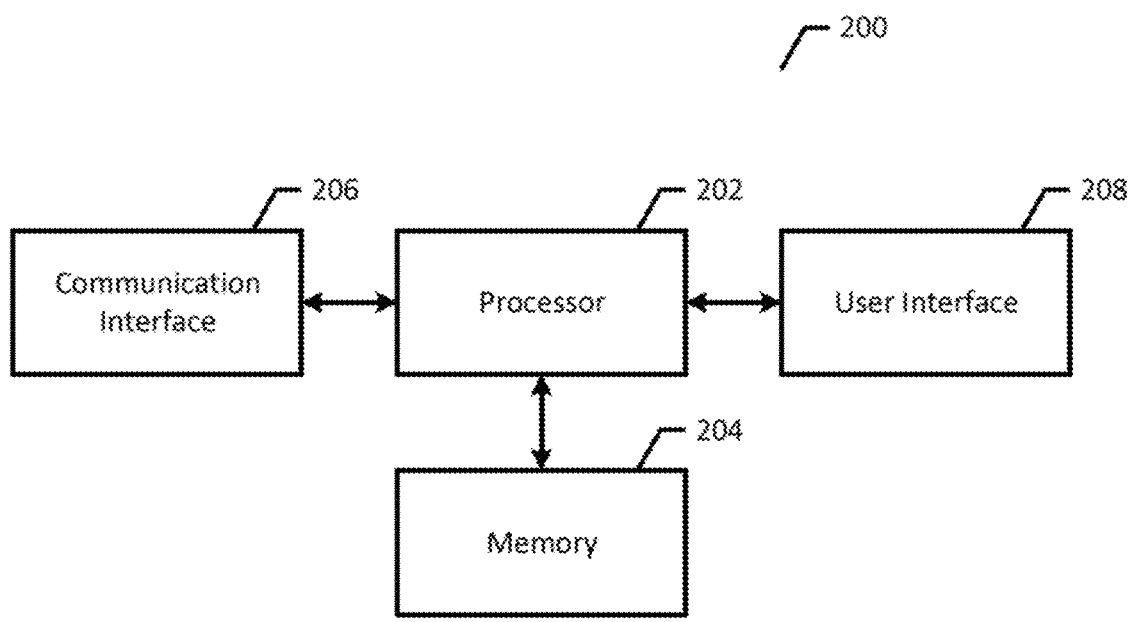
Figure 3:
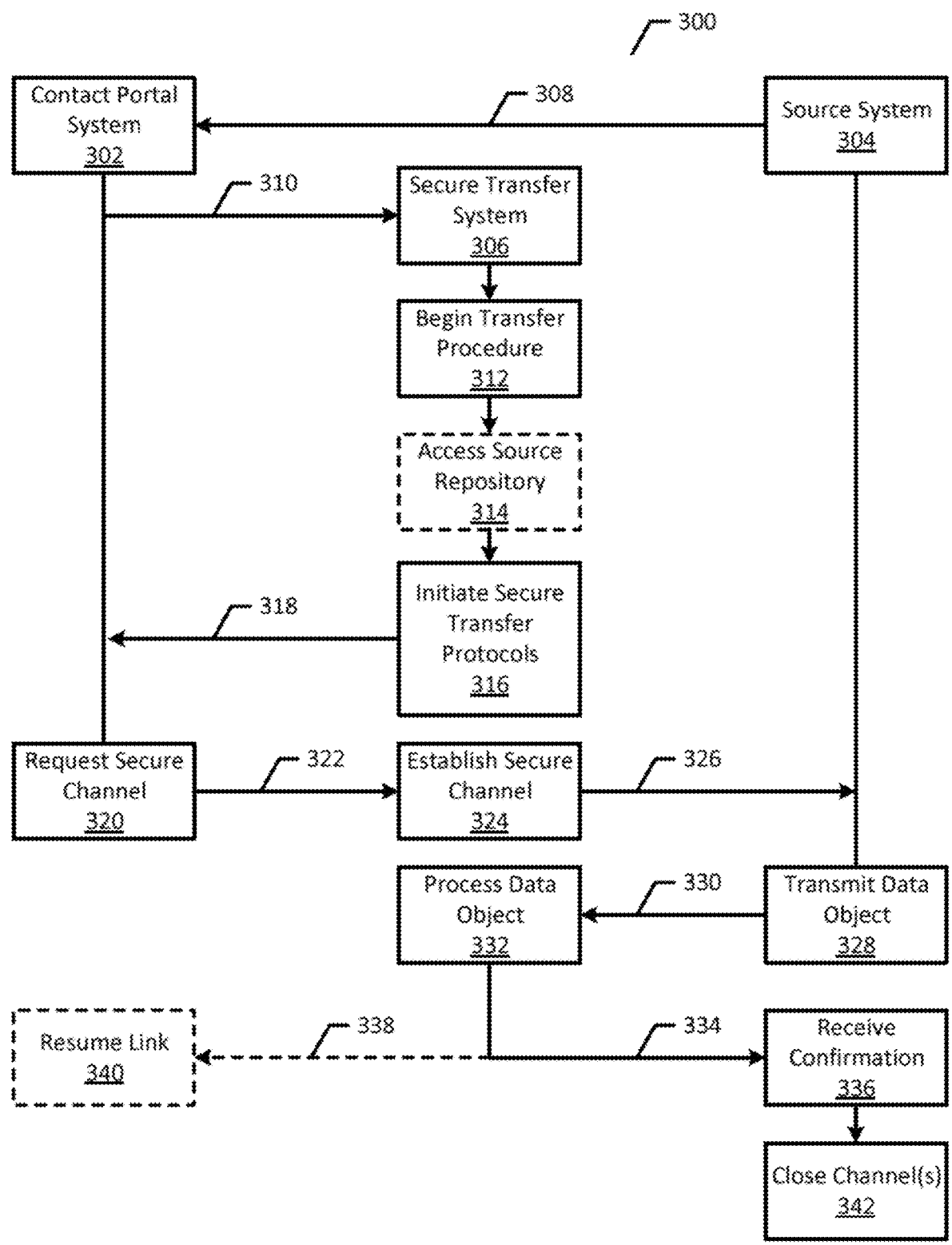
Figure 4:
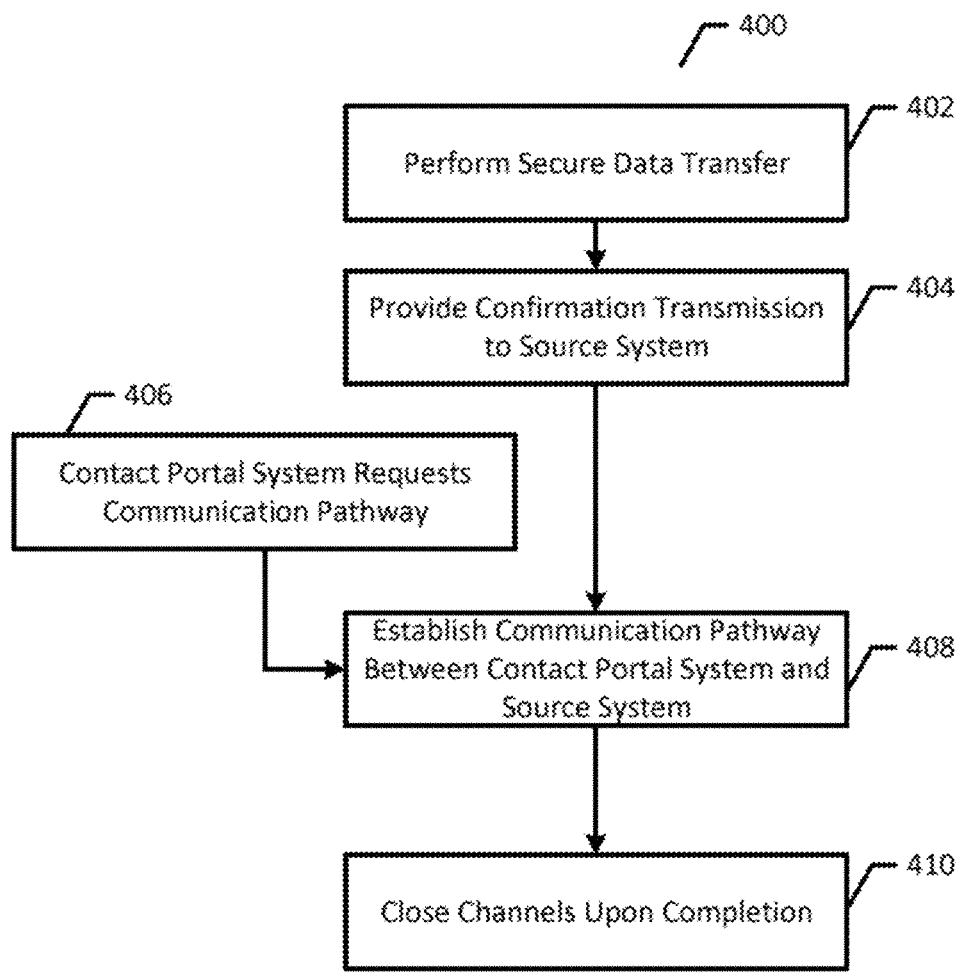
Figure 5:
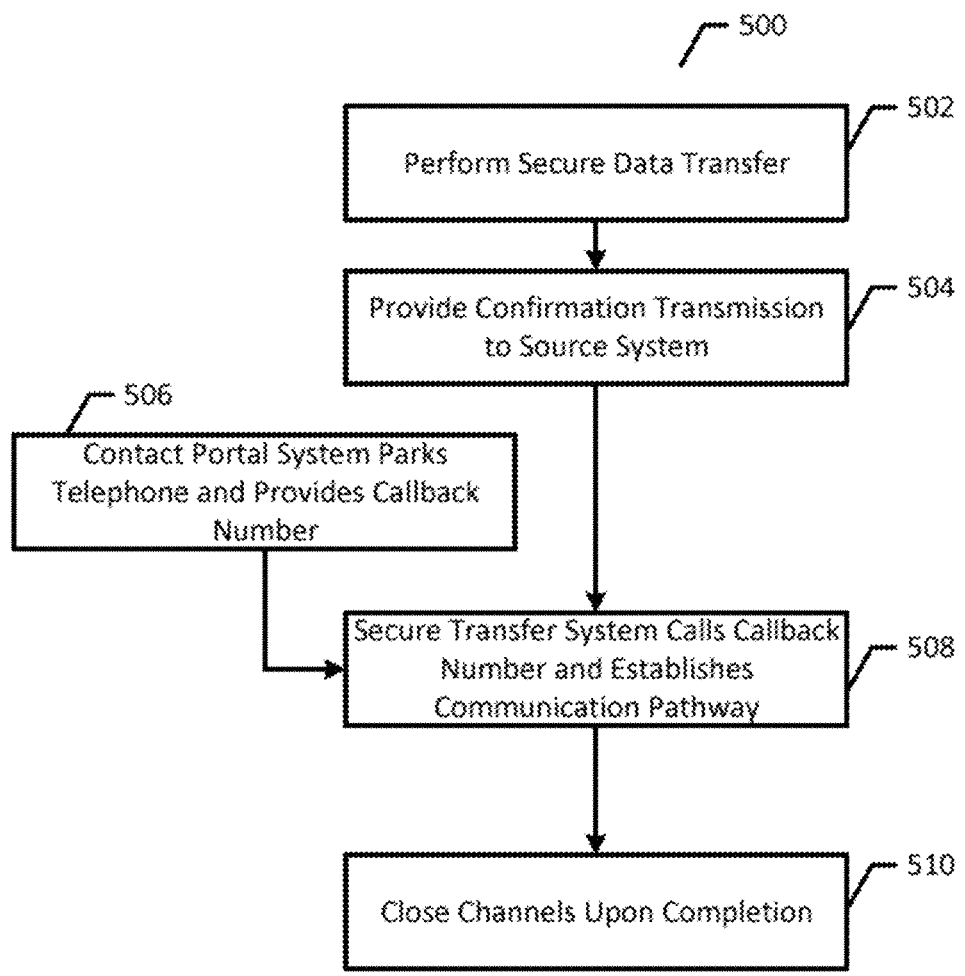
Figure 6:
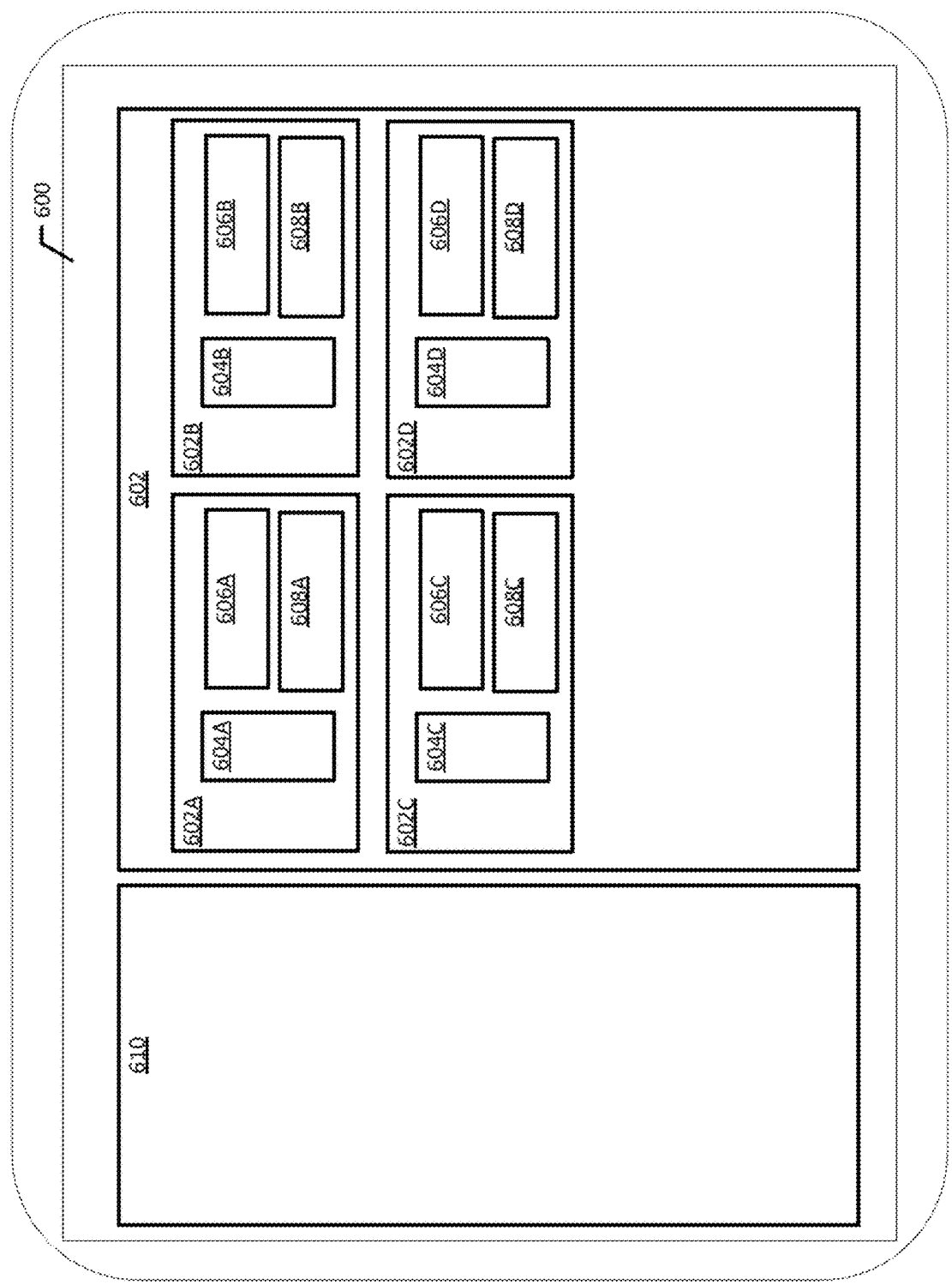
Figure 8A:
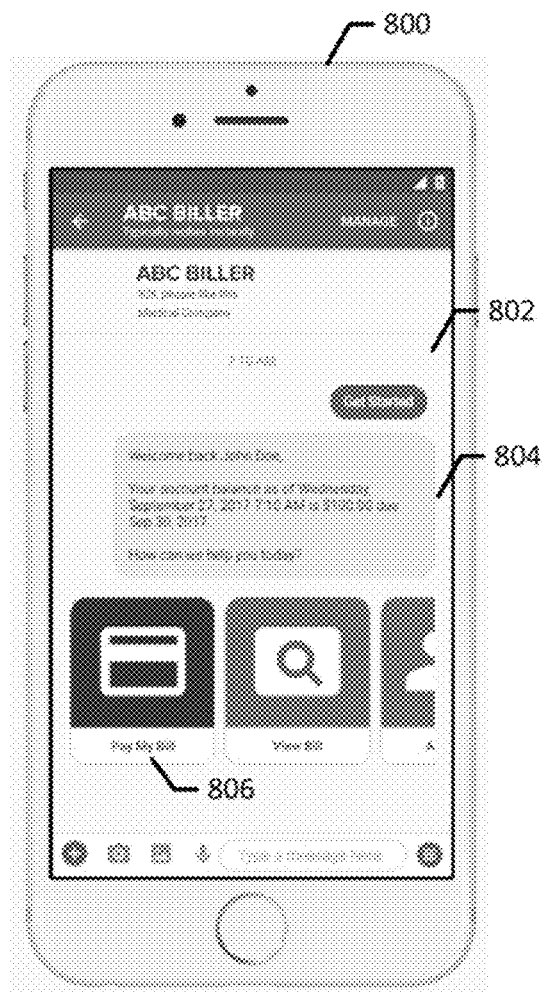
Figure 8B:

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a block diagram illustrating an example communications flow that may be performed in accordance with an example embodiment of the present invention;

FIG. 4 is a block diagram illustrating another example communications flow that may be performed in accordance with an example embodiment of the present invention;

FIG. 5 is a block diagram illustrating another example communications flow that may be performed in accordance with an example embodiment of the present invention;

FIG. 6 is a block diagram of an example interface that may be generated, such as by the apparatus of FIG. 2, in accordance with an example embodiment of the present invention;

FIGS. 7A-7C are block diagrams of example interfaces that may be generated, such as by the apparatus of FIG. 2, in accordance with an example embodiment of the present invention; and FIGS. 8A-8B are block diagrams of example interfaces that may be generated, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to provide for multi-channel secure transmissions of potentially sensitive data. In particular, many advantageous implementations of embodiments of the invention disclosed herein involve and contemplate the rerouting of communication between a source system and a contact portal system through separate, secure communication channels that are established with a secure transfer system.

The rapid development and widespread deployment of high-bandwidth networks and the mobile devices and other computing devices capable of using such networks has caused a significant shift in how individuals communicate with other individuals and entities to go about their daily lives. In particular, many individuals have come to expect to be able to perform remotely, at any time of day, tasks that traditionally require in-person, face-to-face communication during limited windows of time. Moreover, many individuals, businesses, groups, and other entities have come to rely on mechanisms, such as virtual assistants, interactive devices, wearable technology, devices capable of using and/or interacting with one or more artificial intelligence systems, and the like to act on behalf of an individual and/or otherwise assist an individual in performing a range of tasks. One class of such tasks includes, but is not limited to, the remediation of faults, questions, obligations, and other issues that arise with the products, service, and other resources used by an individual, the management of the resources and services used by an individual, and the interaction with agents and/or systems associated with such products, resources, and services.

In order to meet user demands and to improve internal efficiency, many organizations and other entities that provide resources and/or other services to members of the public have developed and deployed contact portal systems that are capable of providing electronic support services through the use of an online interface, through an interactive voice response (IVR) system, through voice communication with an agent in a call center, and/or the like. Many medium- and larger-sized organizations and other entities, such as public and private utilities, municipalities, healthcare organizations (such as clinics and/or hospitals, for example), financial institutions, insurance providers, and the like have deployed or otherwise associated themselves with contact portal systems, which may be referred to in some instances as call centers and/or customer contact centers.

In some instances, for example, such contact portal systems may be integrated with or otherwise controlled by the entity. In other instances, for example, the entity may contract with a third-party provider which operates and maintains contact portal system services on behalf of the entity. This same third-party provider may simultaneously provide contact portal system services to multiple different entities, and may, in some instances, use resources that overlap amongst entities, at least in the sense that communication interfaces, servers, agents, and other resources may be used in connection with multiple different contact portal systems that are otherwise independent of each other. In some situations, a contact portal system may be physically located at one facility or location. In other situations, a contact portal system may use a distributed structure in which multiple facilities are spread out over multiple locations. Such distributed contact portal systems are often used in situations where it is advantageous to staff and maintain call centers in different time zones and/or regions, particularly where an entity seeks to provide call centers that are capable of operating in a variety of languages.

In general, many contact portal systems incorporate a call center or other customer contact center that features multiple pathways through which an individual can interact with the contact portal system and/or an agent associated with the contact portal system. For example, a contact portal system may provide an IVR system to allow callers to engage in self-help and/or other automated activities. A contact portal system may also incorporate live agents for telephonic contact who are trained to provide live services, such as live assistance for example, over the phone or through other electronic communication. A contact portal system may also be structured to allow for a range of communication methods, including but not limited to electronic messaging services such as e-mail, short message service (SMS), multimedia message service (MMS), instant message service (IMS), chat services, and the like, which may be used to facilitate the providing of services, such as customer assistance, online or other remote payment services, and the like.

In some situations, a contact portal system may interface with a website, social media page, and/or other point of contact with a given entity. For example, a social media page associated with a service provider may include a link, chat window, and/or other mechanism to enable communication between an individual and a contact portal system associated with the service provider.

In the context of contact portal systems that incorporate live agents and/or are otherwise configured to provide live assistance (such as through the use of artificial intelligence algorithms and interfaces, for example), agents and/or other resources associated with the contact portal system may typically be connected to a local area network (LAN) via a computing device, such as a personal computer (PC) or other network terminal, that is configured to use a graphics user interface (GUI) or other display to present information to the agent or other user. In some situations, a contact portal system may also incorporate a telephone, such as an Internet protocol (IP) telephone. In some situations, the contact portal system may also incorporate and/or interface with PBX systems, email routing systems, CTI servers, telephony switching facilities, chat servers, conference bridges, and other service nodes and/or systems.

Regardless of the precise network, system, and computational architecture reflected in a particular contact portal system, contact portal systems generally enable electronic communication between an agent and/or other system entity associated with the contact portal system and an individual who is located remotely from the contact portal system.

In many of the examples presented herein, and in the related discussion of such examples, the term "individual" is used to refer to an entity that may be seeking to communicate with a contact portal system. It will be appreciated that the term "individual", as used herein, is not intended to limit the invention to contexts that involve a person directly communicating with a contact portal system. Rather, example implementations contemplate the use of any mechanism capable of acting on behalf of an individual and/or at the direction of an individual, including but not limited to virtual assistants and other software-based bots or other protocols, interface devices such as mobile devices and other devices (such as those that may be considered part of the Internet of things or "IoT" devices), wearable devices, and/or software, protocols, and/or other technology that may be integrated with and/or accessed by such devices. Some examples of such devices and protocols include, but are not limited to those commonly referenced as Siri, Alexa, and the like.

In many instances, the communication between the remote individual and the contact portal system is aimed at allowing the individual to manage the resources and services used by an individual, including but not limited to the remediation of any issues, disruptions, faults and other issues associated with such resources and services. For example, an individual may choose to interact with a resource and/or service provider, such as a utility, medical facility, business, or other entity, by placing a call or activating a web-based interface to initiate communication with a contact portal system associated with the resource and/or service provider. In some example implementations, an interaction may occur through other pathways, such a pathway that incorporates a portions of a social media network and/or related system, and an agent or bot may be able to provide service to an individual or a representative of an individual (including but not limited to a computer program and/or other protocol).

During such a call (or other similar communication, such as a communication that involves any of the networks, communication technologies referenced herein and/or otherwise known), an individual may be required to communicate certain personal, confidential, and/or otherwise sensitive information to the contact portal system (and potentially to a live agent associated with the contact portal system). For example, in situations where an individual seeks to manage a user account, make a payment, and/or otherwise engage in a transaction, the individual may need to provide information regarding an account or credit card number, a related expiration date, date of birth information, a social security number or other identification number, or the like. In situations where a contact portal system is structured as a simple telephonic system, the exchange of such sensitive and potentially confidential information may involve the individual simply reciting or reading out the information to a live agent, who may write down, type, or otherwise record the information as it comes in, and subsequently implement and/or facilitate the desired transaction. In some more sophisticated systems, for example, the contact portal system may be capable of receiving and recognizing dual-tone multi-frequency (DTMF) tones. In such systems, an individual may communicate numeric portions of sensitive and/or potentially confidential information by pressing the buttons on a telephone or similar device, which in turn causes DTMF tones to be conveyed from the caller to the contact portal system. In other systems, such as those that rely on typed, textual communication between an individual and a contact portal system, for example, all of the information exchanged between the individual and the contact portal system, including potentially sensitive information, may be conveyed as human-readable text, such as in an e-mail, text message, chat window, or otherwise.

Regardless of whether sensitive and/or other potentially confidential information is conveyed orally, in text, as DTMF tones, or in another format, the electronic exchange of such information between an individual and a contact portal renders such information vulnerable to misappropriation and other misuse by both internal and external actors, and raises a number of technical challenges associated with the prevention of such misuse. Exchanging sensitive information in many environments (including but not limited to the environments in which many contact portal systems and related networks operate) can be problematic, particularly where the communication channels (such as those that may be associated with a social media network, for example) are not designed to comply with the types of security requirements imposed by PCI, HIPAA, and/or other legal, regulatory, and/or industry-based standards. As described in more detail herein, example implementations of the invention include the establishment of one or more secure communication channels that can be used in connection with interactions that originate and/or otherwise occur in social media channels and/or other similar channels.

One form of potential internal misappropriation or misuse of sensitive information involves the unauthorized use or transfer of such information by the agent who receives the information. For example, an agent associated with a contact portal system who is tasked with receiving sensitive information (such as account or credit card information and/or other sensitive identity information) may use such information to engage in unauthorized and/or fraudulent transactions. Even in situations where the agent is not personally involved in such unauthorized transactions, an agent's notes, writings, or other work product may contain sensitive information which can be lost, misappropriated, and/or used by others.

To address this type of internal misappropriation or misuse of sensitive information, some contact portal systems automatically silence and/or otherwise mask the communication between the individual and the contact portal system agent during the portions of a call or other communication when the individual is actively sending sensitive and/or potentially confidential information to the contact portal system. In some instances, this may take the form of obfuscating DTMF tones as they are received such that an agent associated with the contact portal system is unable to discern the tones as they are entered by the individual. In some instances, for example, masking sensitive information may take the form of silencing, obfuscating, and/or otherwise masking the line on the side of the agent, such that the agent is unable to clearly hear and/or otherwise discern the information as it is entered or otherwise provided. While such approaches tend to prevent, to some degree, the direct conveyance of sensitive information to an agent, such approaches are only marginally effective in that they do nothing to address or prevent efforts by external actors to misappropriate and misuse the sensitive information, at least in part because the sensitive information is still transmitted to and potentially stored by network components at the contact portal system. Moreover, because the "line" or other communication channel between the individual and the contact portal system agent is maintained (but silenced or otherwise masked), the contact portal system agent is often idled during the time the individual is entering their sensitive information. This idling tends to be highly inefficient, at least in the sense that it increases the amount of time the contact portal system resources and agents are waiting for information rather than actively participating in the resolution of the faults or other issues that caused the individual to contact the contact portal system. Moreover, in situations where the masking is performed by components of the contact portal system, computational inefficiencies arise through at least the use of finite system resources to facilitate the masking operations instead of being directed to the core functionality of the contact portal system. In some instances, this redirection of resources may result in impacts on communication bandwidth, throughput, speed, communication quality, and/or other aspects of the performance of the contact portal system.

As noted above, the misappropriation and other misuse of sensitive or confidential information by actors that are external to a contact portal system represents a significant problem for a contact portal system and raises numerous technical challenges. Typically, traditional contact portal systems are designed and deployed such that when an individual communicates with a contact portal system, all of the information contained in the communication between the individual and the contact portal system is conveyed over a non-secure communication channel between the individual and the contact portal system, and the communication channel remains open throughout the duration of the interaction between the individual and the contact portal system. To the extent that information conveyed by the individual implicates a third party system (such as when an individual seeks to make a payment and/or otherwise authorize a transaction that involves drawing on an account or other pool of funds), that information is received by the contact portal system, which subsequently interacts with the third party to facilitate and otherwise complete any tasks or communication aspects that implicate the third party system. As such, sensitive and potentially confidential information is passed via a communication channel from an individual to a contact portal system, and that information is stored, at least temporarily, on servers and/or other databases associated with the contact portal system. It will also be appreciated that, in many technical environments, the underlying network and/or platform architecture was not designed with the issues surrounding contact portal systems in mind. For example, many social media platforms, such as those associated with Facebook and/or Twitter, for example may not have been initially designed to accommodate and facilitate the communication of potentially sensitive information through the social media platform from a user to an interface associated with a contact portal system.

Consequently, external actors often attempt to attack and access these communication channels, servers, or databases associated with a contact portal system to intercept and/or otherwise acquire sensitive and confidential information. Such attacks can cause significant damage in the form of damage to contact portal system components, forced downtime of all or part of a contact portal system, economic losses in the form of fraudulent transactions performed with stolen information, reputational losses to the entities associated with a compromised contact portal system, inconvenience and other disruptions to individuals whose sensitive information is misappropriated and/or misused, and other damages.

To attempt to reduce the risks that attacks on systems will result in the unauthorized access and misappropriation of sensitive information, many organizations and entities who may be damaged by external intrusions into contact portal systems have established and attempted to impose requirements and standards on systems that may be involved in the receipt and storage of various types of sensitive and/or confidential information. For example, the Payment Card Industry Data Security Standard (PCI DSS) establishes a set of security standards that are meant to apply to all data systems that interact with credit card information. Some insurance companies that are involved with insuring businesses and entities against some of the losses associated with data breaches and other similar events also impose requirements on those seeking to be insured. In the context of requirements imposed on automated clearing house (ACH) transactions, voice authentication and/or other audio information may need to be captured and securely stored in order to serve as authentication information.

It will be appreciated that example implementations of embodiments of the invention involve and otherwise contemplate the exchange of a wide variety of sensitive and/or confidential information, including but not limited to information associated with credit cards, debit cards, e-checks, automated clearing house (ACH) transactions, tokens, digital wallets, and other transaction protocols or methods, such as PayPal, Apple Pay, Google Pay, Samsung Pay, prepaid cards, cryptocurrencies (such as Bitcoin and others, for example) and other transactions.

Moreover, example implementations of embodiments of the invention may also involve and contemplate other classes of potentially sensitive or confidential information, including but not limited to identification information, such as a social security number and/or driver's license information, and/or personal information, such as health records and/or other information. In many instances, the particular type and/or types of sensitive information involved in implementations of embodiments of the invention will be subject to one or more sets of security requirements, standards, industry practices, and/or other security protocols. Regardless of whether efforts to improve data security are done in the context of requirements imposed by third parties or from an entity's internal interest in protecting sensitive data, the network technology, components, monitoring efforts, and other resources necessary to effectively defend against attacks aimed at accessing sensitive information are expensive and technically challenging to implement, maintain, and update. Consequently, many entities that use contact portal systems have not, and may not be able to, effectively guard against the unauthorized access of sensitive information.

To address these and other technical challenges, example implementations of embodiments of the invention described and otherwise contemplated herein allow for communication between a source system (such as an individual or other source of sensitive and/or potentially confidential information) and a contact portal system to be rerouted such that sensitive and/or potentially confidential information is never passed from the source system to the contact portal system. Such example implementations involve the establishment of one or more secure communication channels between the source system and a secure transfer system, and the establishment of one or more secure communication channels between the contact portal system and the secure transfer system. Many such implementations are particularly advantageous in contexts where the communication between a source system and a contact portal system would typically involve the exchange of significant volumes of sensitive and/or potentially confidential information, because such sensitive information is not passed to or stored by the contact portal system. Moreover, because some example implementations allow for the source system to communicate with a secure transfer system via a communication channel in a manner that does not require the contact portal system and/or an agent associated with the contact portal system to remain idle during the entry or other transmission of sensitive information, the contact portal system is able to operate more efficiently.

Some example implementations contemplate and provide for the monitoring and processing of requests from multiple source systems in parallel, at least in the sense that contact portal resources that are directed to one source system can be selectively redirected to another source system during periods of time when the first source system is communicating independently with the secure transfer system. Some such example implementations contemplate passing non-sensitive, non-confidential information about the status or progress of communication between a source system and a secure transfer system to the contact portal system, such that the contact portal system may be able to monitor the progress of the source system-to-secure transfer system communication session. In some example implementations, such status information may be displayed to an agent associated with a contact portal system via an interface, such as an interactive dashboard, that may allow the agent to monitor and select amongst multiple source systems that have contacted the contact portal system at or near the same time.

A method, apparatus and computer program product are provided in accordance with example embodiments in order to provide for the selective establishment and use of secure communication channels to facilitate the exchange of data objects containing potentially sensitive information in a network environment.

While the method, apparatus and computer program product of an example embodiment may be deployed in a variety of different systems, one example of a system that may be used in connection with the establishment and use of secure communication channels in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, a secure transfer system 102 includes an online secure transfer system module 102A which is configured to receive, process, transform, evaluate, and otherwise operate on data objects and/or other content which may contain sensitive and/or confidential information, and communicate with a contact portal system (such as contact portal system 104 and a source system (such as source system 106) and any related interfaces via a web server, such as secure transfer system server 102B and/or secure transfer system device 102D. The secure transfer system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown in FIG. 1 may be configured to communicate over any wired or wireless communication network including a wired or wireless local area network (LAN), personal area network (PAN), metropolitan area network (MAN), wide area network (WAN), or the like, as well as interfaces with any attendant hardware, software and/or firmware required to implement said networks (e.g. network routers and network switches). For example, networks such as a cellular telephone, an 802.11, 802.16, 802.20 and/or WiMax network, Bluetooth communication link or links, as well as a public network, such as the Internet, a private network, such as an intranet, or combinations thereof, and any networking protocols now available or later developed, including but not limited to TCP/IP based networking protocols, may be used in connection with system environment 100 and embodiments of the invention that may be implemented therein or participate therein.

As shown in FIG. 1, secure transfer system 102 also includes a secure transfer database 102C that may be used to store information associated with data objects, including but not limited to sensitive and/or confidential information that may be received from a source system (such as source system 106). For example, information that may be stored at or in conjunction with secure transfer database 102C may include, but is not limited to, identification information associated with a data object (including but not limited to unique identifier information, transaction identification, identification of the source of the data object, and the like, for example), locations associated with such option data objects, rule sets to be applied in connection with the processing and other treatment of data objects (such as rules to be applied regarding the treatment and processing of confidential and/or sensitive information, for example), instructions regarding the transmission and/or receipt of funds and/or other resources, and/or other information related to the receipt, transmission, processing, and preservation of data objects and/or other potentially confidential and/or sensitive information, which can be accessed by the secure transfer system module 102A, the secure transfer system server 102B, and/or the secure transfer system device 102D. While FIG. 1 depicts secure transfer system database 102C as a single structure, it will be appreciated that secure transfer system database 102C may additionally or alternatively be implemented to allow for storage in a distributed fashion and/or at facilities that are physically remote from the each other and/or the other components of secure transfer system 102. Secure transfer system 102 is also shown as including secure transfer system device 102D which may take the form of a laptop computer, desktop computer, phone, AI device, and/or mobile device, for example, to provide an additional means (other than via a user interface of the secure transfer system server 102B, for example) to interface with the other components of secure transfer system 102 and/or other components shown in or otherwise contemplated by system environment 100.

In general, secure transfer system 102 is a network entity that is designed and structured in a manner that may be considered secure, at least in the sense that it is hardened against external efforts to attack and/or access the system in an unauthorized manner. For example, the secure transfer system may be PCI DSS compliant, and/or meet other relevant data and/or network security standards that are implicated by the precise nature of the types of confidential information the secure transfer system 102 typically receives, the processes and other operations the secure transfer system 102 performs in conjunction with such information, and the nature of the systems, devices, and other network entities with which the secure transfer system 102 interacts. In some particularly advantageous example implementations, the secure transfer system 102 is able to engage in secure communication through the establishment of secure channels over a wide range of network connections and communication methods, including but not limited to any of the communication architectures, methods, and protocols referenced and/or otherwise contemplated herein.

As shown in FIG. 1, system environment 100 also includes contact portal system 104, which is a network entity that includes a contact portal module 104A and a contact portal device 104B. Contact portal system 104 may exhibit any of the characteristics and/or capabilities of the contact portal systems described herein. For example, contact portal system 104 may function as and/or incorporate a call center or other customer contact center that features multiple pathways through which an individual can interact with the contact portal system and/or an agent associated with the contact portal system, including but not limited to an IVR system, and other electronic communication methods, such as e-mail, short message service (SMS), multimedia message service (MMS), instant message service (IMS), chat services, and the like. In some example implementations, the contact portal system 104 may incorporate and/or interact with one or more artificial intelligence systems and/or interfaces with artificial intelligence systems, such as Apple's Siri system, Amazon's Echo and/or Alexa systems, IBM's Watson system, and/or other artificial intelligence systems. In some situations, the contact portal system may also incorporate and/or interface with PBX systems, Internet protocol (IP) telephone systems and other telephone systems, email routing systems, CTI servers, telephony switching facilities, chat servers, conference bridges, and other service nodes and/or systems. In some example implementations, the contact portal system may be configured to communicate with one or more individuals via a social media platform, such as through messaging, chat, or other communication methods available via Facebook, Twitter, and Google+, for example, and/or through other chat and/or messaging platforms, such as Slack, Skype, and/or Chatbots, for example. As described herein, a contact portal system, such as contact portal system 104, may also incorporate live agents who are trained to provide services and otherwise interact with individuals who initiate communication with the contact portal system 104.

Moreover, while only one contact portal system 104 is depicted in FIG. 1 in the interest of clarity, it will be appreciated that numerous additional such systems may be present in system environment 100, permitting numerous contact portal systems to interact with a secure transfer system (such as secure transfer system 102, for example), and one or more source systems (such as source system 106, for example) to process and otherwise handle requests and/or other communications initiated and/or otherwise received from a source system in a secure manner. Contact portal device 104B may include and/or incorporate a laptop computer, desktop computer, mobile device, or the like, for example, and is configured to interface with a contact portal module 104A to interact with secure transfer system 102. The contact portal system 104 is also capable of communicating with secure transfer system 102 and source system 106.

In some instances, contact portal system 104 may also incorporate a contact portal server 104C. Such implementations may be particularly advantageous in situations where a contact portal system 104 interfaces with numerous source systems and/or other sources of information through the interaction of contact portal system module 104A and contact portal system server 104C. For example, a particular contact portal system 104 may receive requests and/or other communications from a plurality of source systems. In such situations, it may be advantageous for the contact portal system 104, through the operation of contact portal system module 104A and contact portal service 104C, to route and direct such requests to one or more agents associated with contact portal system 104 to assist in processing and/or otherwise handling the incoming requests.

Data objects and related information and/or additional content to be associated with one or more data objects (including but not limited to confidential and/or potentially sensitive information) may originate from a content source system such as source system 106. Source system 106 is a network entity, and a user of source system 106 may use a source device 106B, such as a laptop computer, desktop computer, or mobile device, for example, to interface with an source system module 106A to generate and/or transmit data object information and/or information to be included in an data object, including non-sensitive and/or non-confidential information which may be freely shared with others (including but not limited to a contact portal system, such as contact portal system 104, for example) and confidential and/or sensitive information, which may be sent securely to a secure transfer system (including, but not limited to secure transfer system 102, for example), where such information may be further used and/or processed. While only one source system 106 is depicted in FIG. 1 in the interest of clarity, it will be appreciated that numerous other such systems may be present in system environment 100, permitting numerous sources to communicate with and otherwise interact with secure transfer system 102 and one or more contact portal systems 104. Likewise, it will be appreciated that, in some example implementations, a computer program, such as a virtual assistant, a bot, and/or other software-based entity may operate on the behalf of an individual in the interaction with and operation of one or more aspects of a source system 106.

As shown in FIG. 1, the secure transfer system 102 is capable of communicating with contact portal system 104 via communication channel 108. The secure transfer system 102 is also capable of communicating with source system 106 via communication channel 110. Communication channel 108 and communication channel 110 may be implemented in accordance with any network architecture and/or communication protocol that permits electronic communication between devices and/or system components, including but not limited to the protocols and architectures referenced elsewhere herein. In some advantageous example implementations of embodiments of the invention described and otherwise disclosed herein, communication channel 108 and communication channel 110 are secure communication channels and/or are otherwise resistant to unauthorized monitoring, interception, and/or other intrusion. As shown in FIG. 1, source system 106 and contact portal system 104 are also capable of communicating with each other via communication channel 112. Communication channel 112 may be implemented in accordance with any network architecture and/or communication protocol that permits electronic communication between devices and/or system components, including but not limited to the protocols and architectures referenced elsewhere herein. In most situations, however, communication channel 112 will not be a secure channel.

Overall, and as depicted in system environment 100, secure transfer system 102 engages in machine-to-machine communication with contact portal system 104 and source system 106, via one or more networks, to facilitate the selective establishment and use of secure communication channels to facilitate the exchange of data objects containing potentially sensitive information in a network environment.

Some particularly advantageous example implementations of embodiments of the invention described and otherwise disclosed herein arise in situations where a user of a source system communicates with a contact portal system regarding an issue that requires the exchange of sensitive and/or confidential information. In one such example situation, and with reference to FIG. 1, a source system, such as source system 106, is associated with a customer who wishes to engage in remote communication with source of resources and/or other services used by the customer. In such a situation, a contact portal system, such as contact portal system 104, is associated with the service provider, business and/or other entity with which the customer wishes to communicate.

To initiate communication, the customer may use a mobile device or other source system device 106B to place a call to or to otherwise initiate electronic communication with the contact portal system 104. Upon initiating communication with the contact portal system 104, a non-secure communication channel, such as communication channel 112, is established between the customer (via source system 106) and contact portal system 104. In the course of the discussion or other communication between the customer and the agent or other contact portal system resource (such as a self-help interface and/or an artificial intelligence interface, for example), it may be determined that the issue that triggered the contact by the customer (or another issue discovered in the course of communication with the customer) may require the customer to provide sensitive and/or confidential information. For example, a customer who may have called to complain about a disruption and/or degradation in service may need to pay a bill or otherwise transfer funds to restore and/or upgrade service.

Upon determining that the customer needs to make a payment or otherwise transfer sensitive information, the contact portal system 104 may initiate communication (such as via communication channel 108) with the secure transfer system 102, which, in many advantageous implementations, is configured to and otherwise capable of processing payment transactions and engaging in secure communications with contact portal system 104 and source system 106. Some example implementations contemplate the development and use of system-specific rules or other protocols that may be used in connection with communication sessions between a source system 106, contact portal system 104, and a secure transfer system 102. In some such implementations, predetermined rules may operate to determine when a communication with a source system 106 is transferred to a secure transfer system 102, as well as when (or under what circumstances, for example) communication is reestablished between the source system 106 and the contact portal system 104. For example, as part of initiating communication with a secure transfer system 102, the contact portal system 104 may activate a set of rules such that the source system 106 is replaced in a queue of source systems upon completion of the transmission of confidential information. In another example, one or more predetermined rules may dictate that, upon the entering of an error condition in the transmission of information between the source system 106 and the secure transfer system 102, the source system 106 is placed back in communication with the contact portal system 104. Once in communication with the secure transfer system 102, contact portal system 104 transmits a request to the secure transfer system 102 that a secure link be established between the customer and the secure transfer system, via a secure communication channel between the source system 106 and the secure transfer system 102.

In response to the request from the contact portal system 104, the secure transfer system 102 establishes a secure communication channel (such as secure communication channel 110) between the source system 106 and the secure transfer system 102. Once a communication channel between the source system 106 and the secure transfer system 102, the communication channel between the source system and the control portal system (shown in FIG. 1 as communication channel 112) may be severed, which prevents sensitive and/or potentially confidential information from passing from source system 106 to contact portal system 104. Once in communication with the secure transfer system 102, the customer, via source system 106, may provide to secure transfer system 102 the information necessary to complete a payment or other activity, or otherwise communicate necessary confidential and/or sensitive information. In some example implementations, as part of requesting that a secure communication channel be opened between source system 106 and the secure transfer system 102, the contact portal system 104 may provide to the secure transfer system 102 any information necessary to initiate a transaction, such as an identification number associated with the transaction, an amount to be paid, and other information necessary to ensure that the payment is properly associated with the customer and the entity associated with the contact portal system. In such situations, the customer may only need to provide a limited amount of information to the secure portal system, such as a credit card and/or account number, and information sufficient to establish that the customer is an authorized and/or authenticated user of the relevant payment method.

In some such example implementations, all and/or a substantial subset of all of the relevant contextual and/or authentication information captured prior to the establishment of a secure communication channel is maintained and passed to the secure transfer system. For example, when a user begins a communication with a contact portal system (such as over telephonic call, via a web chat interface, or otherwise) the information conveyed that provides context for the communication (such as the reason for the communication, descriptive information shared during the communication, or the like) along with authentication information (such as authentication accomplished via facial recognition, thumb or fingerprint scanning, voice recognition, query responses, or the like) can be stored for transmission to the secure transfer system. In some implementations, the contextual and/or authentication information may be stored in a data object that can be passed to the secure transfer system (such as through an API or via other data transfer, for example) after the communication channel with the secure transfer system has been established. Consequently, in some such example implementations, the total volume of information (including, potentially, the volume of sensitive information) that must be conveyed from the source system 106 to the secure transfer system 102 is reduced compared to the volume of information that is directed from a customer to a contact portal system in accordance with traditional approaches. Moreover, such implementations recognize further efficiencies by reducing the degree to which user information must be repeated, which reduces the typical duration of a communication session, eases any perceived transition between systems from the perspective of the user, and otherwise reduces the system resources that must be devoted to a given communication session.

During the course of secure communication between the customer (via source system 106, for example) and the secure transfer system 102, the secure transfer system may transmit to the contact portal system 104, via communication channel 108 for example, information regarding the status and/or progress of the payment and/or other transfer of sensitive information between the customer and the secure transfer system. For example, upon the receipt of various pieces of sensitive information, the secure transfer system 102 may push messages to the contact portal system 104 indicating that such information has been received. In the context of a payment, a message may be pushed to the contact portal system 104 upon receipt of the card number information, the expiration date, other security information, a confirmation that the payment is authorized, and/or an indication that the transfer is completed.

In some example implementations, a notification is provided to a user and/or a system associated with a user to confirm the status of the communication session. For example, one or more indications (such as a visual indication presented on a user interface of a source system device and/or other device, an audible indication, or other indication, for example) may be presented when the secure channel has been established, when the representative associated with the contact portal system has been disconnected from the user, and/or to otherwise indicate the secure status of the communication and/or the parties connected to the communication session at any given time. For example, an IVR system may present a pre-recorded audible message indicating that the user is in a secure environment and that the customer service representative associated with the non-secure contact portal system is not privy to the information to be provided. In examples where the communication is text-based and/or otherwise visual, a text message may be displayed, and/or the color of the interface may change to indicate a change in the security status of the session.

Some example implementations further provide for and contemplate situations where communication between a source system, such as source system 106, and a contact portal system, such as contact portal system 104, may need to be restored. For example, during or after securely transferring potentially sensitive information to the secure transfer system 102, the customer associated with source system 106 may have additional questions, issues, or other matters to discuss with an agent or other resource associated with the contact portal system 104 that do not necessarily implicate the exchange of sensitive information. Similarly, particularly in situations where the secure transfer system provides the contact portal system updates regarding the progress and/or status of the transfer of sensitive information, the agent and/or other resource associated with the contact portal system 104 may detect a potential issue, and request to engage in communication with the source system. In some implementations, this request may take the form of activating and/or otherwise pressing a button or otherwise selecting a portion of an interface displayed on the contact portal system 104, which causes a request to be transmitted to the secure transfer system 102. In some implementations, a customer or other user of the source system may enter a request in the course of communication with the secure transfer system 102.

Regardless of the underlying reason for additional communication between the contact portal system and the source system, the secure transfer system may establish communication between the source system 106 and the contact portal system 104 by establishing a communication channel (such as communication channel 108, for example) between the secure transfer system 102 and the contact portal system 104. Once a communication channel is established between the contact portal system 104 and the secure transfer system 102, the secure transfer system 102 may connect that channel to the channel between the source system 106 and the secure transfer system 102. As such, the secure transfer system 102 can act as a conduit through which the source system 106 may communicate with the contact portal system 104 without requiring the re-establishment of a communication channel directly between the source system 106 and the contact portal system 104.

In general, upon detecting and/or otherwise determining that a communication session between a source system and a contact portal system may involve the transmission of potentially sensitive information, a secure communication channel is established between a secure transfer system and the source system, over which the potentially sensitive information may be transmitted for processing by the secure transfer system. The secure transfer system may also establish a communication channel between the secure transfer system and the contact portal system, over which non-sensitive update information and/or other communication may be passed back from or through the secure transfer system. In this regard, the selective establishment and use of secure communication channels to facilitate the exchange of data objects containing potentially sensitive information in a network environment can be accomplished by an apparatus 200 as depicted in FIG. 2. The apparatus may be embodied by and/or incorporated into any of the devices discussed with respect to FIG. 1, such as secure transfer system 102, contact portal system 104, and/or other devices that may be incorporated into or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, e.g., a smartphone, a tablet computer, etc. In some example implementations, it may be particularly advantageous to implement the apparatus 200 in connection with a secure transfer system and/or a contact portal system.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, the operations performed by the apparatus 200 of FIG. 2 in connection accordance with an example embodiment of the present invention are depicted as an example process flow 300. In this regard, the apparatus includes means, such as the processor 202, the memory 204, the user interface 206, the communication interface 208 or the like, for causing a first secure communication channel to be established between a source system and a secure transfer system and a second communication channel to be established between a contact portal system and a secure transfer system, such that communication initiated between the source system and the contact portal system can be rerouted through the secure transfer system, such that confidential and/or potentially sensitive information associated with the source system is not transmitted to, stored by, or otherwise provided to the contact portal system. As such, the apparatus is generally capable of providing for the selective establishment and use of secure communication channels to facilitate the exchange of data objects containing potentially sensitive information in a network environment.

As shown in FIG. 3, process flow 300 involves communications between, and operations performed by, a contact portal system 302, a source system 304, and a secure transfer system 306. Any of the contact portal systems, source systems, and secure transfer systems described or otherwise contemplated herein may be used in example implementations of contact portal system 302, source system 304, and secure transfer system 306, respectively. In some particularly advantageous implementations, source system 304 is a mobile device and/or other communication device associated with a user who uses services and/or otherwise obtains resources from an entity associated with contact portal system 302. In such example implementations, contact portal system 302 may be configured to allow for communication with source system 304 across a wide range of communication protocols and/or platforms, such as voice calls, other telephonic communication, e-mail, text, media, and/or other messaging, chat functionality, and/or other communication pathways, such as those made available via a website interface, voice controlled speaker, virtual assistant and/or an interface associated with a mobile application, or the like, in order to provide assistance and/or other support to the user of the source system 304. In some such example implementations, secure transfer system 306 may be configured to establish and permit secure communication with entities such as source system 306 and contact portal system 302, and may be further configured to be able to process transactions, including but not limited to payment transactions associated with source system 304 and/or contact portal system 302.

As shown in FIG. 3, process 300 commences when source system 304 initiates communication with the contact portal system 302 via transmission 308. In most example implementations, transmission 308 will take place over a standard non-secure communication channel using a public telephone network, the public Internet, and/or other networks and/or network connections. For example, transmission 308 may be in the form of a telephone call placed between source system 304 and contact portal system 302. In another example, transmission 308 may take the form of a request and/or message sent from source system 304 to contact portal system 302 via a website interface or other interface associated with contact portal system 302 and accessible by source system 304.

Upon receipt of transmission 308, the contact portal system 302 and source system 304 may engage in communication. In contexts that involve contact portal systems that are configured to provide assistance to users of source systems that seek to address faults or other issues experienced by the user, the communication between contact portal system 302 and source system 304 may involve speech, text, and/or other data and information that can be used to diagnose and/or otherwise address the faults and/or other issues experienced by the user of the source system. In some instances, contact portal system 302 and/or source system 304 may determine that addressing the fault or other issue experienced by the user of source system 304 requires the exchange of potentially sensitive and/or confidential information. For example, it may be determined that a user of the source system 306 may need to make a payment and/or provide updated personal information in order to activate, update, and/or otherwise address issues with an account associated with the user of the source system 304 and an entity associated with the contact portal system 302.

Upon detecting that further communication between the source system 304 and the contact portal system 302 may involve the exchange of potentially confidential information, the contact portal system 302 establishes a communication channel 310 between the contact portal system 302 and the secure transfer system 306. In some example implementations, the establishment of communication channel 310 may involve a log-in and/or other authentication protocol, such as a single-sign-on (SSO) protocol, through which the contact portal system 304 establishes that it is authorized to communicate with secure transfer system 306.

Once communication between the contact portal system 302 and the secure transfer system 306 is established, process 300 proceeds to block 312, which includes initiating the procedures that will be used in connection with the transfer of sensitive information from the source system directly to the secure transfer system. In some example implementations, initiating such transfer procedures may involve the contact portal system accessing a dashboard and/or other interface associated with the secure transfer system and supplying information associated with the information transfer to be completed by the secure transfer system 306 and the source system 304. In the context of a payment made by a user of the source system 304, the contact portal system 302 may provide the information necessary to ensure that a payment is properly credited to a user of source system 304, such as a name and/or identification number associated with the user and/or the transaction, an amount of the transaction, and any other such necessary information.

In some implementations of block 316, the secure transfer system may determine the set and/or types of confidential information that must be received in order to complete a particular transfer and/or other transaction and established a staged transfer protocol with an associated stage identification number, which may be referred to as a "stage ID." In some implementations, this may take the form of a finite state machine and/or other engine or process that will be used in ensuring that all of the necessary information to complete a particular operation is received properly. For example, in the case of a payment to be made by a user of source system 304, the secure transfer system may need to receive a credit and/or other account number, card expiration date information, additional confirmatory information such as a security code, and other information needed to establish that the payment is being made by and authorized and authenticated account holds.

As shown in FIG. 3, after the initial transfer protocols associated with block 312 have been completed, process flow 300 proceeds to block 316, which includes initiating the secure transfer protocols that will be used in connection with the transmission and receipt of confidential information from source system 304 and, in some situations, with secure communication between the secure transfer system 306 and the contact portal system 302. In implementations of block 316, secure transfer system 306 has determined and/or has otherwise received an indication that sensitive information must be passed from a source system 304 to the secure transfer system 306 to complete the operation requested and/or otherwise required by the user of the source system 306. Upon reaching the point in the transfer process and/or other operation where the entry of sensitive information is necessary and/or otherwise implicated, the secure transfer system 306 transmits a message via transmission 318 to the contact portal system 302, indicating that the secure transfer system 306 is ready to receive sensitive information, and indicating that communication over an unsecured channel between the contact portal system 302 and the source system 304 (and the secure transfer system 306) should be terminated.

As shown in FIG. 3, upon receipt of transmission 318, process flow 300 proceeds to block 320, wherein the contact portal system requests that a secure channel be established between the source system 304 and the secure transfer system 306. In some example implementations of block 320, this may be accomplished by an agent associated with the contact portal system 302 activating a "hot key" or other button or region on an interface. In some example implementations, in addition a "hot key" and/or in alternative to a "hot key", a program and/or other protocol may be used to establish a secure connection based on predefined logic. For example, voice recognition protocols may be used to detect statements made by a customer (such as "I am ready to proceed" or "I am ready to make a transfer") and effect the routing to a secure environment.

Upon requesting that a secure channel be established between the source system 304 and the secure transfer system 306, the contact portal system establishes with the secure transfer system 306 a connection with the communication channel between the contact portal system 302 and the source system 304, as shown at transmission 322. In some example implementations of transmission 322, such as those that arise in the context of a telephonic call, for example, establishing such a connection may include conferencing the source system 304 into the secure transfer system 306. Regardless of the particular approach used to establish a connection between the source system 304 and the secure transfer system 306, once such a connection is established, the contact portal system 302 may close or otherwise terminate any communication channel that directly links the contact portal system 302 to the source system 304.

Moreover, and as shown at block 324, once the secure transfer system 306 is in communication with the source system 304, the secure transfer system can open a secure communication channel over which sensitive information can be safely conveyed, and, as shown at block 326, the secure transfer system establishes communication with the source system 304 via the secure communication channel.

As shown in FIG. 3, once the secure communication channel is established between the source system 304 and the secure transfer system 306, process flow 300 proceeds to block 328, wherein the source system 304 prepares and transmits one or more data objects over the secure communication channel to the secure transfer system 306. In some situations, the one or more data objects may take the form of speech from a user of the source system 304, which is transmitted via transmission 330 over the secure channel between the source system 304 and the secure transfer system 306. In some other example implementations, the one or more data objects may take the form of formatted and/or unformatted text, such as text entered into a web interface, DTMF tones, and/or other signals that can be translated and/or otherwise used by the secure transfer system.

As shown at block 332, process flow 300 recognizes that the secure transfer system 306 will typically need to process and/or otherwise operate on the information received over the secure channel from source system 304. For example, the secure transfer system 306 may use the sensitive information received over the secure communication channel from the source system 304 and non-sensitive information received from the contact portal system 302 to complete the operation and/or other task requested and/or otherwise required by the source system 304. In the context of a payment transaction to be made on behalf of a user of the source system 304, the secure transfer system may use the account information and related authorization and authentication information received from the source system 304 to process the payment.

In some example implementations, multiple pieces of potentially sensitive and other information must be received by the secure transfer system in order to complete a given operation. As each such piece of required information comes into the secure transfer system 306, notifications and other information associated with the operation, such as a stage ID and/or related status information, can be updated and passed to the contact portal system 302 via a communication channel between the secure transfer system 306 and the contact portal system 302. For example, as each required piece of information is received by the secure transfer system 306, an update may be passed to the contact portal system 302, thus permitting the contact portal system 302 to monitor the progress of the source system 304-to-secure transfer system 306 communication, and the operations to be performed by the secure transfer system 306.

Upon receipt of the required sensitive information and/or the completion of any necessary operations associated with such information by the secure transfer system 306, the secure transfer system may, as shown by transmission 334 in FIG. 3, transmit a confirmation message to the source system 304. As shown in FIG. 3, once the source system receives the confirmation message at block 336, process flow 300 may proceed to block 342, wherein the communication session between the source system 304 and the secure transfer system 306 (and any other relevant communication sessions) may be terminated. In some example implementations, this may be accomplished by closing the secure communication channels, either by operation of the secure transfer system 306, the source system 304, or both.

As shown in FIG. 3, some example implementations of process flow 300 optionally contemplate notifying the contact portal system of the progress of the transmission and/or processing of data objects containing sensitive information via transmission 338. In some such example implementations, transmission 338 may be sent via a secure communication channel established between the secure transfer system 306 and the contact portal system 304. In some situations, prior to, during, and/or after the completion of the processing of any data objects by the secure transfer system 306, a user of the source system 304 may wish to reestablish communication with the contact portal system. For example, the user may have a set of questions that it wishes to convey to the contact portal system 302 and/or may wish to engage in other additional communication with the contact portal system 302. Regardless of the motivation or need for reestablishing communication with the contact portal system 304, process 300 contemplates, at block 340, optionally resuming a communication link between the source system 304 and the contact portal system 302. In some such situations, it may be particularly advantageous for the secure transfer system 306 to preserve the secure communication channels in place between it and the source system 304 and the contact portal system 302, such that the communication between the source system 304 and the contact portal system 302 is routed through the secure transfer system 306.

As shown in FIG. 3, some example implementations of process 300 contemplate a preexisting repository of sensitive information and/or other information associated with a source system 304 that is stored securely at the secure transfer system 306. As shown at optional block 314, during the performance of the initial transfer procedures and/or protocols associated with block 312 or otherwise, the contact portal system 302 may query the secure transfer system to determine whether there is an existent repository of source system information stored at the secure transfer system 306. In situations where such a repository exists, it may be possible to complete the transaction and/or other operations requested and/or required by the source system 304 in a secure manner without necessarily establishing additional secure communication channels and/or requiring the transmission of sensitive data by the source system. In some advantageous example implementations, the preexisting repository may include, but is not limited to, an electronic wallet stored with the secure transfer system. In such situations, the contact portal system 302 may be able to instruct the secure transfer system to process the transaction and/or other request from the source system and subsequently notify the source system 304 of the completion of such transaction and/or request.

FIG. 4 depicts an example process flow 400 that provides additional details about example operations that may be performed by the apparatus 200 of FIG. 2 in connection accordance with an example embodiment of the present invention, particularly with regard to operations and/or other processes that may be performed by a contact portal system, source system, and/or a secure transfer system upon completion of the transaction and/or other operation requested and/or required by the source system.

As shown in FIG. 4, process flow 400 commences at block 402, which includes performing a secure data transfer between a source system and a secure transfer system. Any of the approaches to implementing and performing a secure data transfer described and/or otherwise contemplated herein may be used in connection with example implementations of block 402. Upon completion of the secure data transfer and any operations or transactions to be performed by the secure transfer system, process flow 400 proceeds to block 404, which includes notifying the source system of such completion. Any approach to notifying a source system of the completion of an operation associated with a secure data transfer, including but not limited to those discussed and otherwise contemplated with respect to block 336 shown in FIG. 3, may be used in connection with example implementations of block 404.

Many example implementations of process flow 400 contemplate a need for the additional communication between a contact portal system and a source system after the completion of an operation or other transaction by a secure transfer system. As shown in FIG. 4, process flow 400 contemplates at least two approaches by which communication between a contact portal system and a source system may be reestablished by a secure transfer system. As depicted in block 406 the contact portal system may request to be placed back in contact with the source system. In some example implementations of block 406, an agent or other resource associated with a contact portal system may activate a button on an interface to transmit a request to engage in communication with the source system. Such implementations of block 406 may be particularly advantageous in situations where the secure transfer system has transmitted status information to the contact portal system that indicates that the source system may need additional assistance or other intervention by the contact portal system.

In connection with and/or alternatively to implementations of block 406, the source system may transmit a request to the secure transfer system seeking to reestablish communication with the contact portal system. Regardless of whether the request is initiated by the contact portal system, the source system, or another network entity, process flow 400 proceeds to block 408, wherein the secure transfer system establishes a communication pathway between the source system and the contact portal system. Any approach to establishing a communication pathway between two network entities may be used in connection with implementations of block 408. In some situations it may be advantageous to establish an internal communication link within the secure transfer system between the communication channel connecting the secure transfer system to the contact portal system and the communication channel connecting the secure transfer system to the source system. As shown at block 410, upon completion of the communication between the source system and the contact portal system, the relevant communication channel or channels associated with the source system, contact portal system, and/or secure transfer system may be closed.

FIG. 5 depicts another example process flow 500 that provides additional details about example operations that may be performed by the apparatus 200 of FIG. 2 in connection accordance with an example embodiment of the present invention, particularly with regard to operations and/or other processes that may be performed by a contact portal system, source system, and/or a secure transfer system upon completion of the transaction and/or other operation requested and/or required by the source system.

As shown in FIG. 5, process flow 500 commences at block 502, which includes performing a secure data transfer between a source system and a secure transfer system. Upon completion of the secure data transfer and any operations or transactions to be performed by the secure transfer system, process flow 500 proceeds to block 504, which includes notifying the source system of such completion. It will be appreciated that blocks 502 and 504 are similar to block 402 and 404 presented in connection with FIG. 4, and any approach that may be used in implementations of block 402 and/or 404 may be used in connection with example implementations of block 502 and/or 504, respectively.

As shown at block 506, which includes the contact portal system parking a telephone connection, process flow 500 contemplates situations where, after a secure communication channel is established between the source system and the secure transfer system and the non-secure communication channel between the source system and the contact portal system is severed, the contact portal system maintains a communication pathway that may be activated and/or otherwise accessed in the event that communication between the contact portal system and the source system needs to be reestablished. In some example implementations of block 506, the contact portal system may provide to the secure transfer system a callback number and/or other contact information that may be used to access the parked telephone and/or other communication pathway.

As shown at block 508, upon completion of the secure data transfer and/or any related processing by the secure transfer system, and/or at the request of the source system, the secure transfer system may place a call or otherwise contact the contact portal system and connect the source system to the contact portal system. As shown at block 510, upon completion of the communication between the source system and the contact portal system, all relevant communication channels may be closed.

It will be appreciated that some example implementations allow for all data captured in the relevant secure communication channel to be encrypted both in motion and at rest. In some example implementations, multi-factor authentication may be used to confirm any relevant identities of entities and/or systems that may need to operate with and/or otherwise access such information. Likewise, intrusion detection systems, including systems with persistent and/or continuous monitoring may be used in connection with securing the relevant communication channels and/or data.

FIG. 6 depicts an example user interface 600 that may be used in accordance with example implementations of embodiments of the invention disclosed herein, including but not limited to process flows 300, 400, and 500, along with any of the other operations associated with the selective establishment and use of secure communication channels to facilitate the exchange of data objects containing potentially sensitive information in a network environment. The interface 600 may be presented on, for example, a terminal and/or other display associated with a contact portal system, including but not limited to a mobile device such as a mobile phone and/or any the other mobile devices described and/or contemplated herein, or on any other display, such as a monitor or other display associated with contact portal system 104 and/or any other device capable of interfacing with a source system, such as source system 106 and/or a secure transfer system, such as secure transfer system 102. Many particularly advantageous implementations of embodiments of the invention, some of which relate to the user interface 600, arise in the context of systems and network environments that are aimed at allowing for the exchange of potentially sensitive information necessary to complete transactions and/or other operations in a customer-service context that involves remote communication between users and contact portal systems in a network environment in a secure manner. As such, some of the examples presented herein include details that are directed to such contexts. However, it will be appreciated that such details are presented herein for the purpose of clarity and to otherwise facilitate the understanding of some of the concepts and aspects of the invention disclosed herein, and are not intended to confine the invention or any embodiments thereof to any single context or situations.

As discussed elsewhere herein, example implementations of embodiments of the invention described and otherwise disclosed herein allow for the establishment of secure communication channels between a source system and a secure transfer system, such that once a source system is placed in secure communication with a secure transfer system, the direct, non-secure communication channel between a contact portal system and the relevant source system may be severed. Some such situations further contemplate one or more communication channels being established between the secure transfer system and the contact portal system, such that non-sensitive status and/or update information regarding the transfer of sensitive and/or confidential information between the source system and the secure transfer system can be passed back to the control portal system. As a result, many example implementations contemplate the ability of an agent or other resource associated with a contact portal to engage in other activities (such as the assistance of other users associated with other source systems, for example) during the periods of time during which a source system is engaged in the transfer of data objects containing sensitive information to a secure transfer system. This may be particularly advantageous to the extent that it allows an agent and/or other resource associated with a contact portal system to effectively process multiple request in parallel, and/or prioritize or re-prioritize particular source systems with respect to other source systems based on the severity of the issue or issues associated with the source system and/or other predetermined rules or protocols.

As shown in FIG. 6, the interface 600 includes a set of selectable elements 602, which are individually shown as 602A-602D, each of which is associated with a source system (and therefore a related incoming request to a contact portal system, and, once established, one or more secure communication channels with a secure transfer system). As shown in FIG. 6, each selectable element 602A-602D in the set of selectable elements 602 includes a set of selectable element fields 604-608. In example implementations that involve the interface 600 being presented to an agent or other resource associated with a contact portal system that is tasked with addressing issues presented by users of source systems and/or responding to requests or inquiries made by such users, each of the selectable elements 402A-D may be associated with a source system (such as, in the case of a system involving the remediation of customer issues, including but not limited to the initiation and acceptance of payment transactions, each selectable element 402A-D may be associated with an in-progress customer service call), for example.

Each individual selectable element field 604-608 for a given selectable element 602 may each present a category of information related to source system. For example, selectable element field 604 may be used to display information about a user of a source system, such as biographical information, status information, communication duration information, contact information associated with the source system, and/or the like. In example implementations that involve contact portal systems and/or other systems that are able to ascertain information about a potential fault or issue underlying the communication from the source system, such information may also be displayed in connection with selectable element field 604, for example. In some example implementations, such as those that involve the passage of update and/or status information from a secure transfer system back to a contact portal system, selectable element field 606 may be used to display such update information and/or information pertaining to any request by the secure transfer system and/or the source system to reestablish communication between the contact portal system and the relevant source system. In some example implementations, selectable element field 608 may be a button or "hot key," that when activated by an agent and/or other resource associated with the contact portal system, causes a predetermined function to be performed, such as transmitting a request that a secure communication channel be established, transferring a source system to be in communication with a secure transfer system, requesting that the contact portal system be placed in communication with a source system, or the like.

It will be appreciated that, in addition to the examples provided herein, a wide range of other information may be displayed in one or more of selectable element fields 604-608, including but not limited to a unique identifier and/or stage ID associated with a given source system, a time at which a secure communication channel was established, a running clock associated with the transfer and/or processing of data objects containing sensitive information, a geographic region associated with the source system, identification information associated with a user of a source system (including but not limited to indicia of a relationship between the user and the entity associated with the contact portal system), depictions (such as check marks or other graphic representations, for example) of whether a transaction and/or other operation was confirmed as received or otherwise complete by a secure transfer system, an indication of whether an error condition is detected, a description of a detected error condition, notes regarding a source system or a user of a source system, and/or other indicia associated with a source system, issues and/or request associated with that source system, and the secure transfer of data from that source system.

In some example implementations of interface 600, the selectable element fields 604-608 may include, but are not limited to, information presented in text, graphic, and/or other visual form that provides information about the particular selectable element 602. In some example implementations of interface 600, the set of selectable element fields 604-608 may include a set of one or more "buttons" or other regions of the interface that an agent and/or other resource associated with a contact portal system may select to trigger a further action of the interface. For example, a user of the interface may press a region of the interface and/or otherwise provide an indication to the selectable element field 606 that causes a complete and/or otherwise expanded set of information associated with the particular selectable element 602 to be presented on the user interface 600, such as in viewing area 610, for example.

As discussed elsewhere herein, some example implementations of embodiments of the invention contemplate establishing secure communication channels between a secure transfer system and one or more source systems to permit the secure exchange of sensitive information necessary to perform transactions and/or other operations associated with the source system. Any of the operations described or otherwise contemplated herein, including but not limited to efforts to address issues, remedy faults, and/or perform transactions involving a source system and confidential information associated with such a source system may trigger the presentation of an indication on the interface 600, such as in viewing area 610, for example, and/or on or as part of the particular interface element associated with the source system. For example, in some situations, it may be advantageous to change a color of the selectable element 602A-602D that is associated with a source system with which the contact portal system is actively engaged in communication. In another example, a change of color of all or part of a selectable element 602A-602D may be advantageous if an error condition and/or another condition requiring rapid attention is detected. For example, a selectable element may be turned to red in the case of an error.

In some situations, it may be advantageous to add a button and/or rename a button associated with a selectable element field 604-608, to alert a user of the interface to a change in condition of a source system, a related communication channel, and/or the transmission of potentially sensitive information by that source system across a secure communication channel. Upon selection of such a button, the viewing area 610 may be populated with relevant information about the source system at issue, and presented to the user via the interface It will be appreciated that, although the depicted interface 600 displays only the selectable elements 602, the selectable element fields 604-608, and the additional interface element 610, it is within the scope of this invention to transmit and/or display any information communicated to and from the interface 600 and any related systems, including but not limited to a source system and/or a secure transfer system, and/or any other system that is capable of communicating with the interface 400.

FIGS. 7A, 7B, and 7C present a series of views of example interfaces that may be used in connection with example implementations of embodiments of the invention. It will be appreciated that while the example scenarios discussed with respect to FIGS. 7A-7C may use language referencing a telephonic discussion involving a customer, a service representative, and a secure transfer system, the examples and interfaces presented herein may be applied in contexts involving communications that arise in the context of other types of communications, including but not limited to web-based communications, communications involving social media platforms, and other portals through which customers (and/or mechanisms operating on behalf of a customer and/or other user) may interact with service providers and secure transfer systems.

FIG. 7A presents a depiction of an example interface 702 that may be presented to a customer service representative (such as a customer service representative associated with a contact portal system) who has been assigned to assist a customer who has contacted the contact portal system. If, in the course of the communication between the customer service representative and the customer, the potential for a customer to make a payment arises, the customer service representative may be presented with example interface 702. In some example implementations, the customer service representative may access example interface 702 by selecting a tab or other selectable object on a service dashboard and/or other interface. In some example implementations, the customer service representative may be presented with the example interface 702 automatically based on the detection of words or statements from the customer (such as through voice and/or text recognition protocols). Regardless of how the customer service representative arrives at the example interface 702, example interface provides a mechanism for the customer service representative to acquire contextual and/or other non-confidential information from the customer and to facilitate the routing of subsequent, potentially sensitive communication through a secure channel.

As shown in FIG. 7A, example interface 702 may include a series of fields 704 that may be populated with information. In some example implementations, at least some of the fields 704 may be manually populated by the customer service representative. In some example implementations, one or more of the fields 704 may be automatically populated, such as through acquiring information provided by the customer (such as via a fillable form, text detection and/or parsing protocols, and/or through other information detection and extraction approaches, for example). As shown in FIG. 7A, some examples of the sorts of information that may be included in fields 704 may include, but are not limited to, a customer's name, address, telephone number, email address, other contact information, customer identifier, and/or other information that may establish a customer's identity and/or provide information to facilitate a transfer on behalf of the customer.

As shown in FIG. 7A, example interface 702 also includes field 706. In some example implementations, field 706 holds a callback number, which may be used to facilitate a call from a secure transfer system back to the customer service representative to enable communication between the customer and the customer service representative after the exchange of potentially sensitive information has been accomplished via the secure transfer system. As such, a callback can be routed back to the customer service representative if the customer has additional needs. While the example interface 702 in FIG. 7A shows field 706 as a callback number, in some example implementations, a callback may be routed to a queue, and/or the customer service representative may be automatically reconnected with the customer upon completion of any tasks that required the exchange of potentially sensitive information.

The example interface 702 also includes fields 708, which may be used to trigger and/or otherwise facilitate a connection between the customer and a secure transfer system. As shown in the example interface 702, fields 708 may include selectable and/or fillable objects that allow for an indication of when a payment or other transfer should be made, the method through which a payment may be made, a payment amount, and one or more buttons or other selectable objects that allow for the transfer of a customer to a secure transfer system (and/or the termination of the interaction and/or transition to another interface). As shown in FIG. 7A, if a customer has previously made a payment, a non-confidential indicator of an account that may be used to make a payment (such as an indicator with a redacted portion of the relevant account number) may be presented in a drop-down menu and/or other selectable object set, along with options to transfer to an IVR and/or other secure transfer system for payment via a credit card, debit card, e-check, and/or other payment method. In some example implementations, upon the filling and/or selection of a required set of information and/or interface objects, the customer may be placed in secure communication with a secure transfer system. In some such example implementations, the information presented in the various fields contained in example interface 702 may be passed to the secure transfer system, which may result in a reduction in the need for a customer to repeat and/or re-enter contextual and/or authentication information.

FIG. 7B presents a series of example interfaces 710, 712 and 714 that may be presented to a customer service representative in connection with the approaches to facilitating a secure communication channel (and the secure communication of potentially sensitive information) between a customer and a secure transfer system. As shown in example interface 710, a customer service representative may activate one or more selectable objects 710A to "hot key" a customer into a secure communication system, such as one associated with an IVR system and/or other approach to receiving and processing potentially sensitive payment and/or other information. In some alternative example implementations, the customer service representative may dial a number to establish a connection between the customer and the secure transfer system, and/or a communication session between the customer and the secure transfer system may be established automatically in response to the detection of words, phrases, and/or other actions taken by the customer. Upon the establishment of a secure communication channel between the customer and the secure transfer system, the customer service representative will be dropped and/or otherwise excluded from the communication between the customer and the secure transfer system such that potentially sensitive information is not passed from the customer (or any other system) to the contact portal system and/or the customer service representative. In some example implementations, the secure transfer system and/or a related system may present the customer with an audio, visual, and/or other indication that a secure channel has been established. In some situations where non-confidential information has been passed to the secure transfer system to provide contextual, authentication, and/or other information regarding the customer and/or the nature of the call, the secure transfer system may cause a script to be recited to the customer in advance of the customer service representative being dropped from the communication. For example, an IVR system associated with a secure transfer system may play an automated message that requests that a customer confirm a stated amount to a stated account number associated with a payee. In the event that the stated information is correct, the customer service representative may be dropped from the call. In the event that the stated information is incorrect, the customer may be rerouted back to the customer service representative so that corrective action can be taken.

As shown in FIG. 7B, elements 710C, 712, and 714 show iterations of an example interface that contains fields that allow the customer service representative to monitor non-sensitive information that depicts the progress of the transaction between the customer and the secure transfer system. As shown in FIG. 7B, these fields may include, but are not limited to, an indication of the credit card number used, an expiration date, a CVV number, a status indicator, and/or an amount indicator. It will be appreciated that the orientation and content of these fields may change depending on the type of information to be exchanged between the customer and the secure transfer system.

In situations where a secure IVR and/or another aspect of a secure transfer system requests confidential and/or other potentially sensitive payment-related information from a customer, the customer may be prompted to provide a card number, expiration date, CVV number, and potentially other required information. As shown FIG. 7B at element 710C, after being released from the communication channel with the customer, the customer service representative is shown an iteration of an interface that indicates that none of the payment information has been provided to the secure transfer system. As shown in iterations 712 and 714 of the example interface, after each element or other piece of information is successfully entered and/or otherwise exchanged with the secure transfer system, the secure transfer system may pass an indication to the agent, such as in the form of a check mark, and/or as a non-confidential version of the information received from the customer, for example. For example, as shown at 712, a redacted version of the customer's credit card number and an indication of the expiration date can be received from the secure transfer system and caused to be displayed on the interface viewed by the customer service representative. As shown at 714, for example, the interface may be configured such that when all information is properly entered and/or otherwise received by the secure transfer system, a confirmation number may be displayed to the customer service representative. Depending on the particular configuration of the interface and/or the system in which an interaction takes place, this confirmation number may be read to a customer (such as by the customer service representative during a reconnected communication session, for example) or otherwise played or presented to the customer (such as by an audio transmission during a call, and/or via visual display presented to the customer). In some example implementations, a customer may be provided with further prompts, such as options to press one or more buttons to repeat the confirmation number, return to a communication session with an agent, to terminate the call, and/or other options.

In some example implementations of the interface, in instances where a required element of information is not properly received by the secure transfer system, an indication may be passed to the interface such that an "x" or other indicator that a piece of information was not received, can be presented to the customer service representative. FIG. 7 presents a series of example interfaces 720 and 722 that may be presented to a customer service representative in connection with the approaches to facilitating a secure communication channel (and the secure communication of potentially sensitive information) between a customer and a secure transfer system. As noted above, and as shown in example interface 720, in situations where information is not properly received and/or erroneously entered into the secure transfer system, an indicator, such as an "x" or other indicator, for example, can be displayed in the interface shown to the customer service representative. As shown in interface 720, upon determining that the payment failed (such as through the entry of incorrect information by the customer and/or non-entry of required information, for example), an "x" is displayed, indicating that the payment failed. In some example implementations, if a payment fails and/or if a customer makes a pre-determined number of errors (such as three errors, for example) in the secure environment, the secure transfer system and/or a related system may automatically cause the customer to be reconnected with a customer service agent, where further assistance may be provided.

As shown in interface 722, a customer service representative may also be signaled, such as in a manner similar to that discussed herein with respect to customer mistakes and/or non-entry of information by a customer, in the event that a customer hangs up and/or otherwise terminates a communication session.

FIGS. 8A and 8B present a series of interfaces that may be presented to a user seeking to make a secure transfer of information in accordance with an example embodiment of the invention disclosed herein. While some example implementations described herein are discussed with reference to an IVR system and/or other communication system that involves verbal communication between one or more entities, some example implementations of embodiments of the invention arise in contexts that do not involve oral or other audible communication. For example, as illustrated in FIG. 8A or 8B, a user of a mobile device 800 may navigate (such as through a web browser, application, or other approach, for example) to a webpage, social media site, and/or other page or network location associated with a provider of goods or services. For example, a customer may navigate to a webpage (or open a specific application) associated with a given provider. Alternatively, a user may navigate to a Facebook page and/or other social media site associated with the provider. Upon navigating to the website (or social media page and/or other portal) associated with the provider, the customer may click a link, select an option, and/or otherwise choose to engage in communication with a contact portal system associated with the provider. Upon doing so, an interface, such as the example interface 802 shown in FIG. 8A, may be presented to the user via the touch screen (or other display, for example) of the user's device 800.

As shown in FIG. 8A, the example interface 802 provides a mechanism for the user to interact with a contact portal system associated with a given provider. Element 804 in FIG. 8A shows an example chat window, where a user may interact with a human agent and/or an automated agent (such as an artificial intelligence system, for example). As shown in the example in FIG. 8A, the contact portal system may also be able to identify and/or authenticate the identity of the user. For example, the contact portal system may recognize the mobile device 800 and/or otherwise receive information (either automatically and/or as entered or otherwise provided in the interface, for example) identifying and authenticating the user. Upon doing so, the user may be presented with information and/or prompts from the contact portal system regarding the user's account and/or other information regarding the relationship between the user and the provider or other entity associated with the contact portal system. For example, an account balance and/or other customer service questions may be presented to the user.

Example interface 802 in FIG. 8A also includes at least one selectable object 806. As shown in FIG. 8A, the example interface 802 includes a selectable object 806 which allows the user to indicate that the user wishes to pay a bill and/or otherwise perform a transfer of potentially sensitive information. Upon selecting object 806, the user may be placed in secure communication with a secure transfer system, and the communication channel between the user and the contact portal system may be released and/or otherwise blocked or terminated, such that none of the user's potentially sensitive information is passed to or otherwise received by the contact portal system. As such, the user maintains the ability to access the contact portal system through familiar channels (such as an app, webpage, Facebook page, Twitter page, and/or other social media site and/or other public access point associated with a given biller or other provider) while achieving access to a secure transfer system that allows for the secure transfer of data, without the need to actively navigate to another portal and/or other system.

Upon selecting object 806 and being placed in secure communication with the relevant secure transfer system, the user may be presented with an interface similar to that shown in FIG. 8B as example interface 810. As shown in FIG. 8B, example interface 810 may include, for example a set of information 812, which in FIG. 8B is shown as a set of payment information (such as the name on a relevant account, one or more relevant addresses, an account number, payment and billing date information, billing and payment amount information and/or other relevant information, for example). Example interface 810 also includes a set of selectable objects 814, which may allow the user to select how a bill is paid and/or how other information is transferred. For example, as shown in FIG. 8B, the set of selectable objects 814 includes a set of credit and/or other payment accounts, which the user may select and use when making a payment and/or other transfer in the secure transfer system. As noted above, by enabling a user to be placed in communication with (or otherwise achieve access to) a secure transfer system directly from a contact portal system that is accessible through a webpage or other site that is familiar to the user, the user can achieve both a required level of customer service and the added benefits of a secure channel in which to exchange sensitive information without needing to navigate between multiple sites. Moreover, since the customer initially contacts the contact portal system, the entity associated with the contact portal system can manage the customer service experience in the interactions surrounding the transition into and out of the secure transfer system.

Additional Illustrative Example Implementations

As described herein, many example implementations of embodiments of the invention described herein allow of the selective establishment and use of secure communication channels to facilitate the exchange of data objects containing potentially sensitive information in a network environment. Many such example implementations are particularly advantageous in that they allow for all of the potentially sensitive and/or confidential information associated with a transaction to be routed securely through a single system that meets the relevant data security requirements and/or otherwise provides for a protected data transfer and storage environment, such that other network entities (particularly contact portal systems, for example) do not receive such confidential and/or sensitive information and thus do not become subject to rules and/or other requirements regarding the storage and protection of such sensitive information. Many example implementations are also particularly advantageous in that they allow for the exchange of status information and/or other context information between and amongst contact portal systems and secure transfer systems, such that a user of a source system is not burdened with needing to repeat information that was previously exchanged with a contact portal system and such that a contact portal system is aware of issues and/or other status or context information associated with the secure transfer of sensitive information between the source system and the secure transfer system. Several example implementations are set out in more detail herein for the purpose of illustrating situations where these and other aspects may be particularly advantageous. It will be appreciated that, while many of the examples described herein are expressed in terms of relatively direct communication between an individual and one or more agents associated with a contact portal system and/or a secure transfer system, some example implementations contemplate and allow of one or more individuals to be replaced by automated systems, such as digital personal assistants, artificial intelligence systems, automated messaging system, and/or other mechanisms that may not require direct human operation of one or more functions associated with the seeking and providing of information, the establishment of secure communication channels, the exchange of information within a secure environment, and/or the like.

Example 1

In one example implementation, a user accesses a mobile website associated with a service provider, merchant, or other source of goods and/or other resources via the user's mobile device. The contact portal system associated with the mobile website may detect, based on the user's actions on the mobile website, that the user may need assistance in completing a transaction, such as a payment for services. Upon detecting the potential need for assistance, the user is transferred to a non-secure communication session, such a chat window or a telephonic call, for example, with an agent associated with the contact portal system. That agent may be presented with all of the information about the user's recent interaction with the mobile website, along with any non-sensitive information regarding the user's relationship with the entity associated with the mobile website and the contact portal system. During the course of the communication session between the agent and the user, it is determined that the transaction in which the user wishes to engage requires the exchange of the user's confidential information, such as a credit account number. Upon such a determination, a secure communication channel is established between the user's mobile device and a secure transfer system capable of receiving the credit account information and processing the transaction.

Example 2

In another example implementation, a user is traveling in their car, and uses an artificial intelligence system or interface, such as an AI interface integrated into the vehicle and/or an AI interface integrated in the user's mobile device (such as Siri, for example), to connect with a contact portal system associated with a merchant through whom the user wishes to acquire certain resources. Upon encountering a point in the communication between the user and the contact portal system after which confidential information must be provided by the user, the contact portal system hands off the communication with the use to a secure transfer system, such that both the contact portal system and the artificial intelligence interface are bypassed and do not receive any confidential and/or potentially sensitive information.

While many of the examples disclosed herein reference and/or arise in the context of a telephonic voice call, it will be appreciated that example implementations of embodiments of the invention may be used, and are particularly advantageous, in situations where communication from a source system originates over other communication channels or methods, including but not limited to web-based communications (such as website interfaces, for example), mobile application and/or mobile web interfaces, social media communication platforms, chat platforms and/or chat functionality, messaging application, artificial intelligence (AI) interfaces, and other communication methods. Some example implementations that use such communication methods may be particularly advantageous in situations where data regarding the user's prior use and/or communications can be captured and provided to an agent or other resource associated with a contact portal system and/or the secure transfer system.

Example 3

After using a mobile device to interact with a mobile web interface, such as social media communication interface (such as Facebook messenger, for example), the user is connected with an agent associated with a contact portal system. As part of the process of establishing communication between the agent and the user, the user's recent activity (such as an identification of the portions of the social media page they have viewed, information they have typed and/or otherwise entered into the interface, or the like) may be passed to the agent associated with the contact portal system. After the agent associated with the contact portal system transfers the user to a secure transfer system, the secure transfer system may push or otherwise transmit to the contact portal system periodic updates regarding the transmission of confidential information from the user to the secure transfer system. Upon the triggering of one or more predetermined rules based-events (such as multiple failures at the same step in a transfer of information, an activation of a button by the user to request assistance from the agent, the expiration of a time limit, or the like, for example), the secure transfer system may patch the agent associated with the secure transfer system into communication with the user. As part of reestablishing communication with the contact portal system, a set of context information associated with the transaction that the user attempted to complete may be passed to the contact portal system. For example, the secure transfer system may indicate which pieces and/or categories of information were correctly entered, which pieces of information were not entered and/or incorrectly entered, and/or any information about a fault that may have occurred (such as an expiration date being in the past, a card number not matching the cardholder name information, a declined transaction as indicated by a service provider associated with the card or other account, or the like). In some example implementations, it may also be advantageous for the secure transfer system to record audio information received from the user, such as voice authentication information and/or other verbal instructions, which may be stored in conjunction with the transaction and/or otherwise associated with the user and/or a particular set of user interactions with the secure transfer system.

Upon reestablishment of communication with the contact portal system and providing the agent associated with the contact portal system with the context information associated with the interaction between the user and the secure transfer system, the agent associated with the contact portal system may assist the user. This assistance may be particularly efficient and/or advantageous in situations where the context information obtained from the secure transfer system is combined with the information regarding the prior user's interaction with the contact portal system. For example, the agent may be able to discuss with the user the issues that were encountered, and facilitate the transaction through other means, such as another payment method in a previously stored online wallet, or by providing instructions to the user and reconnecting the user to the secure transfer system, for example.

While some example implementations described herein contemplate the use of a telephonic call and/or other voice communication between an agent associated with a contact portal system and a user of a source system, other approaches to communication may be used. For example, a text-to-speech algorithm may be used to convert typed guidance or advice from an agent into audible signals that a user may be able to hear during communication with the contact portal system and/or during periods of time when the user is in communication with the secure transfer system.

Example 4

In another example, a user may use a chat or messaging interface, such as Facebook's messenger interface, for example, to initiate contact with a contact portal system, which subsequently transfers the user to a chat interface with a secure transfer system. In the course of attempting to provide confidential information to the secure transfer system, the user may type a command into the chat interface, such as "OPERATOR", "HELP", or another word, command, or piece of text that is recognized as a request to reestablish communication with the contact portal system. Upon reestablishing a connection with the contact portal system, the secure transfer system may pass all of the non-sensitive status information and non-sensitive chat history to the contact portal system, such that an agent associated with the contact portal system is able to seamlessly assist the user and identify the issues that likely caused the user to request assistance. For example, the payment method that was selected during the initial communication between the user and the secure transfer system may be determined to be inappropriate for a particular transaction, expired, or otherwise unavailable, for example. In response to such a determination, the user may be prompted by the contact portal system to select another method to complete the transaction. Upon the selection of the alternate method, the user may be transferred back to the secure transfer system along with an indication of the selected alternative method, and the transaction may be completed.

It will be appreciated that, regardless of the communication pathway used to initially establish communication between the user of the source system and the communication portal, other communication pathways may be used to establish communication between the user of the source system and the secure transfer system, and/or between the secure transfer system and the contact portal system. As such, example implementations of embodiments of the invention disclosed herein specifically contemplate multi-channel, secure communication in network environment that is heterogeneous, at least in the sense that the secure transfer system is capable of communicating securely across any of the communication channels, methods, or other communication approaches referenced and/or otherwise contemplated herein.

Example 5

In some example implementations, the initial communication from the user of the source system may be directed to the secure transfer system, rather than the contact portal system. For example, a user, through a telephonic call, interaction with a web interface, chat interface, AI interface, and/or any of the other communication methods or pathways referenced or otherwise contemplated herein, may initiate communication with the secure transfer system and request to engage in a transaction that involves an entity that has a relationship with the secure transfer system (such as a service provider, merchant, and/or other source of goods, services, and/or other resources that is has a relationship with the secure transfer system for the purposes of processing payments and/or other transactions. In such an example implementation, the secure transfer system, such as through an application interface and/or another support platform associated with the secure transfer system, may handle all of the preliminary communication with the user to identify the user and/or the transaction or other operation in which the user wishes to engage. In some such situations, it may be advantageous for the secure transfer system to establish a communication channel between the secure transfer system and a contact portal system and/or other network entity associated with the source of goods, services, and/or other resources to obtain information about the user that may be necessary to facilitate the transaction. Upon determining that payment information and/or other sensitive information must be used to complete the transaction, the secure transfer system may access a pre-existing repository associated with the user, such as a pre-established online wallet and/or engage in secure communication with the user to obtain the sensitive information necessary to complete the transaction. In the event that the user needs to engage in communication with the source of the goods, services, or other resources (such as if the user has a product-specific question, or requires other information that is not available to the secure transfer system in an efficient manner, the secure transfer system may place the user in communication with a contact portal system associated with the source of the goods, services, and/or other resources. Likewise, the contact portal system may transfer the user back to the secure transfer system in the event that the additional exchange of sensitive information is necessary.

Regardless of whether a source system initiates communication with a contact portal system or a secure transfer system, the contact portal system and the secure transfer system are capable of passing context and/or other status information associated with the source system and/or user of the source system to provide a seamless support experience across a wide range of communication pathways, while ensuring that sensitive and/or confidential information does not pass from the source system to the contact portal system or other non-secure network entity.

As described above, FIGS. 3, 4, and 5 illustrate flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for the selective establishment and use of at least one secure communication channel to facilitate the exchange of data objects containing private or sensitive information in a network environment, the method comprising:
    establishing a communication channel between a first network entity and a second network entity;
    receiving at the first network entity, a request comprising a contextual data object from the second network entity;
    in an instance in which the contextual data object is indicative of a need for a secure communication channel causing the secure communication channel to be established between the secure transfer system and the second network entity;
    causing a second communication channel to be established between the secure transfer system and the first network entity;
    receiving, at the secure transfer system via the secure communication channel, a data object comprising said private or sensitive information associated with the second network entity; and
    transmitting via the second communication channel, status information associated with the data object,
    wherein said status information is indicative of whether the data object was successfully transmitted via the secure communication channel.

2. The method of claim 1, wherein said causing the secure communication channel to be established between the secure transfer system and the second network entity comprises automatically causing the secure communication channel to be established between the secure transfer system and the second network entity.

3. The method of claim 1, wherein the first network entity comprises a contact portal system.

4. The method of claim 3, wherein the contact portal system comprises an online interface or an interactive voice response (IVR) system accessible via one or more communication channels.

5. The method of claim 1, further comprising:
    receiving, at the first network entity, from the second network entity, an authentication data object, wherein the authentication data object comprises one or more of: a password, voice scan, a facial scan, a fingerprint scan, a query response, a social security number, a portion of the social security number, a last four digits of the social security number, or a pin number.

6. The method of claim 1, further comprising:
    causing display, via an interface, to an agent or agent device associated with the first network entity, said status information.

7. The method of claim 1, wherein the communication channel is secure.

8. The method of claim 1, wherein the communication channel is not secure.

9. The method of claim 1, further comprising:
    transmitting the private or sensitive information towards the second network entity.

10. The method of claim 1, wherein the private or sensitive information comprises one or more of: a cardholder name, credit card information, a pin number, a mailing address of a cardholder, account number, date of birth, or a social security number.

11. The method of claim 1, wherein the second communication channel is not secure.

12. The method of claim 1, further comprising:
    transmitting, towards the first network entity or the second network entity, a confirmation that the secure communication channel has been established between the secure transfer system and the second network entity.

13. The method of claim 1, further comprising:
    terminating the secure communication channel once the data object comprising said private or sensitive information associated with the second network entity is received at the secure transfer system.

14. An apparatus for the selective establishment and use of secure communication channels to facilitate the exchange of data objects containing private or sensitive information in a network environment, the apparatus comprising:
    a processor; and
    a memory storing program code, the at least one memory and the program code being configured to, with the processor, cause the apparatus to at least:
        establish a communication channel between a first network entity and a second network entity;
        receive a request comprising a contextual data object and a authentication data object from the second network entity;
        in an instance in which the contextual data object is indicative of a need for a secure communication channel causing the secure communication channel to be established between the secure transfer system and the second network entity;
        cause a second communication channel to be established between the secure transfer system and the first network entity;
        receive, via the secure communication channel, a data object comprising said private or sensitive information associated with the second network entity; and transmit via the second communication channel, status information associated with the data object, wherein said status information is indicative of whether the data object was successfully transmitted via the secure communication channel.

15. The apparatus of claim 14, wherein said causing the secure communication channel to be established between the secure transfer system and the second network entity comprises automatically causing the secure communication channel to be established between the secure transfer system and the second network entity.

16. The apparatus of claim 14, wherein the first network entity is a contact portal system.

17. The apparatus of claim 16, wherein the contact portal system comprises an online interface or an interactive voice response (IVR) system accessible via one or more communication channels.

18. The apparatus of claim 14, wherein the second network entity comprises a mobile device or a computer.

19. The apparatus of claim 14, wherein the contextual data object comprises an indication of a reason for the communication.

20. The apparatus of claim 14, wherein the at least one memory and the program code are further configured to, with the processor, cause the apparatus to cause display of the status information to an agent associated with the first network entity via an interface.

21. The apparatus of claim 14, wherein the communication channel is secure.

22. The apparatus of claim 14 wherein the communication channel is not secure.

23. The apparatus of claim 14, wherein the private or sensitive information comprises one or more of: a cardholder name, credit card information, a pin number, a mailing address of a cardholder, account number, date of birth, or a social security number.

24. The apparatus of claim 14, wherein the second communication channel is not secure.

25. A non-transitory computer readable medium comprising program code that, when executed by a processor, causes the processor to:

establish a communication channel between a first network entity and a second network entity;

receive a request comprising a contextual data object and a authentication data object from the second network entity;

in an instance in which the contextual data object is indicative of a need for a secure communication channel, cause the secure communication channel to be established between the secure transfer system and the second network entity;

cause a second communication channel to be established between the secure transfer system and the first network entity;

receive, via the secure communication channel, a data object comprising said private or sensitive information associated with the second network entity; and transmit via the second communication channel, status information associated with the data object, wherein said status information is indicative of whether the data object was successfully transmitted via the secure communication channel.

* * * * *